(12) United States Patent
Makhija et al.

(10) Patent No.: US 12,488,310 B2
(45) Date of Patent: Dec. 2, 2025

(54) DATA NETWORK, SYSTEM AND METHOD FOR DATA INGESTION IN A DATA NETWORK

(71) Applicant: NB Ventures, Inc., Clark, NJ (US)

(72) Inventors: Subhash Makhija, Westfield, NJ (US); Huzaifa Shabbir Matawala, Princeton, NJ (US); Shivendra Singh Malik, Vasco-da-Gama (IN); Mukesh Rama Kunder, Navi Mumbai (IN)

(73) Assignee: NB Ventures, Inc.

( * ) Notice: Subject to any disclaimer, the term of this patent is extended or adjusted under 35 U.S.C. 154(b) by 385 days.

(21) Appl. No.: 17/502,530

(22) Filed: Oct. 15, 2021

(65) Prior Publication Data

US 2023/0119881 A1 Apr. 20, 2023

(51) Int. Cl.
*G06Q 10/087* (2023.01)
*G06F 18/214* (2023.01)
*G06Q 10/0835* (2023.01)
*G06V 30/19* (2022.01)

(52) U.S. Cl.
CPC ......... *G06Q 10/087* (2013.01); *G06F 18/214* (2023.01); *G06Q 10/0835* (2013.01)

(58) Field of Classification Search
CPC .............. G06Q 10/087; G06Q 10/0835; G06F 18/214; G06F 18/2323; G06F 18/2413; G06V 30/1914; G06V 30/19147; G06V 30/1916; G06V 30/19167; G06V 30/19187; G06V 30/414
See application file for complete search history.

(56) References Cited

U.S. PATENT DOCUMENTS

| | | | |
|---|---|---|---|
| 2021/0182996 A1* | 6/2021 | Cella | G06Q 10/0631 |
| 2023/0052533 A1* | 2/2023 | Furtak | H04L 41/12 |
| 2023/0067069 A1* | 3/2023 | Ghatage | G06F 18/217 |

* cited by examiner

*Primary Examiner* — Peter Ludwig
*Assistant Examiner* — Reva R Moore
(74) *Attorney, Agent, or Firm* — David M. Breiner; BrownWinick Law Firm

(57) ABSTRACT

The present invention provides a data network, a data ingestion system and a method of data ingestion in the data network for a supply chain management enterprise application. The data network includes one or more data objects of different data types received from different data sources structured on multiple distinct architecture, connected to each other for executing multiple functions in the enterprise application.

29 Claims, 21 Drawing Sheets

800A

| S.No. | Application Model Properties / Attributes | | Considered For DataNetwork | Master Data Reference | Transactional Data Reference |
|---|---|---|---|---|---|
| 1 | DocumentCode | | Yes | | |
| 2 | DocumentName | | Yes | | |
| 3 | DocumentNumber | | Yes | | |
| 4 | InvoiceStatus | Id | Yes | | |
| 5 | | Name | | | |
| 9 | | status | | | |
| 10 | InvoiceDocumentType | | Yes | | |
| 16 | InvoiceSource | | Yes | | |
| 17 | InvoiceBasicDetails | InvoiceAmount | Yes | | |
| 18 | Stakeholders | FirstName | | | |
| 19 | | LastName | | | |
| 20 | | StakeholderType | Yes | USER MASTER | |
| 21 | | ContactCode | Yes | | |
| 22 | | PoxyContactCode | | | |
| 23 | SupplierInvoiceNumber | | Yes | | |
| 24 | Supplier | Id | | | |
| 25 | | Name | Yes | SUPPLIER MASTER | |
| 26 | | ClientCode | Yes | | |
| 27 | | supplierVATNumber | | | |
| 28 | | sourceSystemName | | | |
| 29 | SupplierInvoiceDate | | | | |
| 30 | ReceivedDate | | | | |
| 31 | OrderDetails | OrderNumber | Yes | | Purchase Order |
| 32 | | OrderName | | | |
| 33 | | OrderId | | | |
| 34 | | OrderDate | | | |
| 35 | | | | | |

```
{
  "eventHeader": {
    "bpcId": "70021961",
    "bpcName": "Client",
    "businessUnit": null,
    "applicationId": "107",
    "objectCode": "ef9d6667-9690-454b-b4d2-dee90cc20e3f",
    "objectType": null,
    "contactCode": "7002196104000001",
    "contactName": "admin",
    "authToken": "",
    "regionId": 1,
    "timestamp": 1614234185
  },
  "event": {
    "name": "NEXXE:INVOICE:INSERT",
    "type": null,
    "action": "INSERT",
    "source": null,
    "version": 1
  },
  "eventData": {
    "documentCode": "ef9d6667-9690-454b-b4d2-dee90cc20e3f",
    "documentName": "Invoice 02/25/2021 06:23:04",
    "documentNumber": "INV-2021.000427",
    "invoiceStatus": {
      "documentStatus": 1,
      "id": "9690-454b-b4d2-dee90c",
      "name": "Draft",
      "culture": "en-US",
      "version": 0
    },
    "orderDetails": {
      "orderNumber": PO-12345,
      "orderName": OrderNumber1,
      "orderId": "9690-454b-b4d2-dee90cc20e3f",
      "orderDate": "2021-02-25T00:00:00"
    }
  }
}
```

FIG. 12A

DATA NETWORK, SYSTEM AND METHOD FOR DATA INGESTION IN A DATA NETWORK

BACKGROUND

1. Technical Field

The present invention relates generally to enterprise applications. More particularly, the invention relates to a data network and data ingestion in the data network for an enterprise application including a Supply chain management (SCM) enterprise application.

2. Description of the Prior Art

Data Network for an enterprise application plays a critical role in executing various functionalities. Enterprise application such as supply chain management applications involves execution of complex scenarios with lot of data floating across multiple functionalities which makes it extremely challenging for the existing computing systems to process such data efficiently.

The data source for supply chain applications are also very distinct. Moreover, the data sources have an underlining data structure and implementation architecture that may be unique for an entity. In such a situation, it is extremely difficult for the existing computing systems to manage the data flow across functionalities supported by inherently distinct architectures. On several occasions is becomes too complex for the system to process the data and derive a meaningful result for executing enterprise application operations. Further, the data types are also distinct which represents new challenges of transforming the data efficiently through existing computing devices and extracting relevant data for deriving relationships.

The data network for an EA needs to be structured with distinct relationship between data including a document data or a file data, which requires improvement in the functioning of the existing computing systems. None of the prior arts address the structural complexity and technical issues in creating a data network for an Enterprise application that executes complex functions supported by existing architecture designs, computing systems and infrastructure.

Also, there are unique processing challenges with data floating inside enterprise applications depending on whether the application is developed on codeless or coded platform (s) due to the inherent nature of the development framework. The architecture remains unsupportive in multiple aspects including data generation through dynamic workflows. The basic structure of applications supporting such development have inherent issues due to the complexity of the functions to be executed in supply chain management applications. Enterprise Application designed on microservices architecture having multiple isolated data stores of structured and unstructured data makes it difficult to provide centralized network across multiple system. The technical problems associated with interfacing and data collection from other enterprises systems, IOT devices, Blockchain and connecting with data objects is extremely complex. Further, in such a scenario, the structuring of a data network with relevant relationships requires specific technical implementation to ensure it is functional.

In view of the above problems, there is a need for networks, systems, and methods of data ingestion in networks that can overcome the problems associated with the prior arts.

SUMMARY

According to an embodiment, the present invention a data network, a system and a method for data ingestion in a data network for a Supply chain management enterprise application. The data ingestion method includes receiving at a server, one or more data objects from at least one data source, extracting by a data extraction process executed by a processor, one or more data elements and one or more data attributes associated with the one or more data objects, processing by the processor coupled to an AI engine, the extracted one or more data elements and the one or more data attributes to identify at least one relationship of the one or more extracted data attribute with one or more historical data elements stored in a historical data elements database wherein the at least one relationship is identified based on one or more data model associated with historical data elements database, and linking by the processor and a data analyzer, the processed one or more data attribute to one or more historical data elements and assigning an identifier to the one or more processed data elements of the data object associated with the data attribute before ingesting the data element in the data network as a data element node.

In an embodiment the present invention provides a system for data ingestion. The system includes a server for receiving one or more data objects from at least one data source, a processor configured to extract by a data extraction process, one or more data elements and one or more data attributes associated with the one or more data objects, a historical data elements database configured to store one or more historical data elements wherein the processor coupled to an AI engine processes the extracted one or more data elements and the one or more data attributes to identify at least one relationship of the one or more extracted data attribute with the one or more historical data elements based on one or more data model associated with the historical data elements database, and a data analyzer configured for enabling the processor to link the processed one or more data attribute to one or more historical data elements and assigning an identifier based on the at least one relationship to the one or more processed data elements of the data object associated with the data attribute before ingesting the data element in the data network as a data element node.

In an embodiment, the present invention provides a data network. The data network includes a server configured to receive one or more data objects from one or more data source, one or more data element nodes configured to create one or more sub-network through a graphical data structure wherein one or more data elements are extracted from the one or more data objects for analysis to identify the one or more data elements to be ingested as one or more data element node of the data network, one or more data connectors of the graphical data structure configured for connecting the one or more data element node to form the data network wherein the one or more data connectors include at least one identifier configured to identify the one or more data element node of the data network based at least one relationship between one or more data attributes associated with the one or more data object and one or more historical data element, and a processor coupled to an AI engine configured for processing the one or more data objects based on ensemble of one or more data models including graphical data model, document data model and relationship data model wherein the one or more data attribute of the one or more data objects are linked to the one or more historical data elements and the identifier is assigned based on the at least one relationship to the data elements of the data object associated with the data attribute before ingesting the data element in the data network as a data element node to create the data network.

In an embodiment, the at least one data source is a linkedchain implemented data source or a non-linkedchain implemented data source wherein for the linkedchain implemented data source the one or more objects received at the server are connected to a linkedchain architecture of the data source and an adapter having a configurator and access control module connects to the linkedchain architecture for enabling fetching of the data objects generated by the at least one data source.

In an embodiment, the at least one data source is a graphchain implemented data source with a plurality of decentralized RDF (resource data framework) graphs connected to each other and structuring a linkedchain of the RDF graphs thereby providing a self-scaling and self-regulated cross-verifying transaction framework as the graphchain disseminates the data objects in data shards between multiple nodes in the RDF graph.

In an embodiment, the present invention includes a data injection architecture including an event broker adapter, a broker cluster and a layered database structure with one or more-layer elements coupled to the processor and the analyzer for processing wherein the event broker adapter includes a native connector to an event broker API (Application programming interface).

In an embodiment, the present invention provides a computer program product for data ingestion in a data network for a SCM enterprise applications of a computing device with memory. The product includes a computer readable storage medium readable by a processor and storing instructions for execution by the processor for performing the above method.

In an advantageous aspect, the system and method of the invention structures a data object connection dynamically with model driven AI (artificial intelligence) to identify relationships for structuring a data network. Further, the present invention utilizes Machine Learning algorithms, prediction data models, graphical data models, linkedchain and graphchain-based data sources, artificial intelligence-based processes for structuring a data network and ingesting data in the network to enable execution of one or more SCM application operations. Moreover, the data network executes functions for enterprise applications regardless of the development architecture of the EA application.

BRIEF DESCRIPTION OF THE DRAWINGS

The disclosure will be better understood and when consideration is given to the drawings and the detailed description which follows. Such description makes reference to the annexed drawings wherein:

FIG. 8A shows a table providing invoice data mapping template in accordance with an example embodiment of the invention.

FIG. 12A is an invoice document event data model in accordance with an example embodiment of the invention.

DETAILED DESCRIPTION

Figure 1:
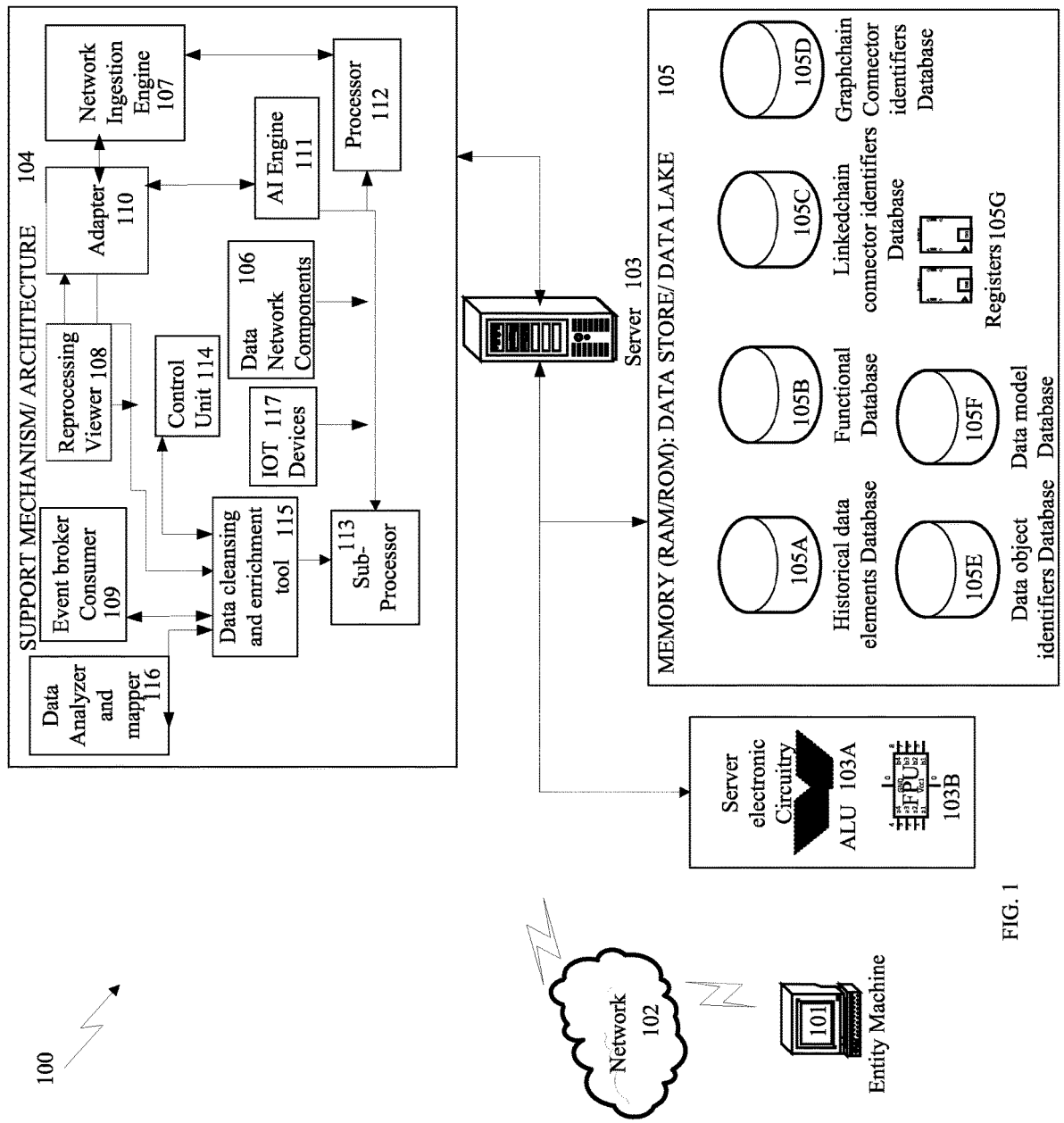
FIG. 1 is a system diagram of a data ingestion system for an enterprise application in accordance with an example embodiment of the invention.

Described herein are the various embodiments of the present invention, which includes a data ingestion system and method of data ingestion in a data network for an enterprise application.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to"

another element or layer, it can be directly on, connected to, or coupled to the other element or layer or intervening elements or layers that may be present. As used herein, the term "and/or" includes any and all combinations of one or more of the associated listed items.

Spatially relative terms, such as "links," "nodes," or "connectors"," and the like, may be used herein for ease of description to describe one element or feature's relationship to another element(s) or feature(s) as illustrated in the figures. It will be understood that the spatially relative terms are intended to encompass different workflows of the process in use or operation in addition to the workflows depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to data ingestion in a data network for enterprise application including supply chain management application.

Referring to FIG. 1, a system diagram 100 for a data ingestion system is provided in accordance with an embodiment of the present invention. The system 100 is configured to ingest data extracted from complex operations of one or more SCM applications to structure a data network. The system 100 includes an entity machine 101 configured for generating, sending, receiving, modifying one or more data object or executing one or more Supply chain management (SCM) operations of an enterprise application over a network 102.

The system 100 includes a server 103 configured to receive data and instructions from the entity machines 101. The system 100 includes a support mechanism 104 for performing various data network structuring functions including prediction through AI engine and mitigation processes with multiple functions including historical dataset extraction, classification of historical datasets, artificial intelligence-based processing of new datasets and structuring of data attributes for analysis of data, creation of one or more data models configured to process different parameters, structuring of workflows etc. The system 100 further includes a memory data store/data lake 105 having one or more databases configured for storing distinct datasets including historical element dataset, data model datasets, identifiers etc.

In an embodiment, the system 100 is provided in a cloud or cloud-based computing environment. The codeless development system enables more secured processes.

The entity machines 101 may communicate with the server 103 wirelessly through communication interface, which may include digital signal processing circuitry. Also, the entity machine may be implemented in a number of different forms, for example, as a smartphone, computer, personal digital assistant, or other similar devices.

In an embodiment the server 103 of the invention may include various sub-servers for communicating and processing data across the network 102. The sub-servers include but are not limited to content management server, application server, directory server, database server, mobile information server and real-time communication server.

In example embodiment the server 103 shall include electronic circuitry for enabling execution of various steps by processor. The electronic circuitry has various elements including but not limited to a plurality of arithmetic logic units (ALU) 103A and floating-point Units (FPU's) 103B. The ALU enables processing of binary integers to assist in formation of at least one table of data attributes where the data models implemented for dataset characteristic prediction are applied to the data table for obtaining prediction data and recommending action for structuring of a data network and data ingestion in the data network. In an example embodiment the server electronic circuitry includes at least one Athematic logic unit (ALU) 103A, floating point units (FPU) 103B, other processors, memory, storage devices, high-speed interfaces connected through buses for connecting to memory and high-speed expansion ports, and a low-speed interface connecting to low-speed bus and storage device. Each of the components of the electronic circuitry, are interconnected using various buses, and may be mounted on a common motherboard or in other manners as appropriate. The processor can process instructions for execution within the server 103, including instructions stored in the memory or on the storage devices to display graphical information for a graphical user interface (GUI) on an external input/output device, such as display coupled to high-speed interface. In other implementations, multiple processors and/or multiple buses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a back-end web server communicatively coupled to at least one database server, where the back-end web server is configured to process the data objects based on one or more data models by receiving from an ensemble of the one or more data models, a recommended identification parameter processed by the server and applying an AI based dynamic processing logic to the recommended identification parameter to automate tasks.

In an embodiment, the support mechanism/architecture 104 of the system 100 includes the data network 106, network ingestion engine 107, reprocessing viewer 108, event broker consumer 109, Data Adapter 110 including event broker adapter, an AI (Artificial Intelligence engine) 111, a processor 112, sub-processor 113, a control unit 114, a data cleansing and enrichment tool 115, a data analyzer and mapper 116 and an IOT device 117.

In an exemplary embodiment, the data network 106 of the present invention connects the entire data across disparate applications as a unified structure, enabling understanding of the relation between different types of data, which are used by varied stakeholders to make technical & strategic decisions. Having a unified structure enables relating multiple data sources which were previously sitting isolated without any significance to one another. Data network 106 for enterprise application provides standardizing the data model across varied applications which helps in relating different applications, data from different data sources quite easily and thus helping in quick decisions.

In an embodiment, the data network 106 is a graphical data network configured to process document data model, relationship data model and graphical data model structured data objects wherein an AI engine coupled to a processor is configured to enable the network to assign the identifier based on the data attributes associated with the data objects.

In a related embodiment, the graphical data network 106 includes a plurality of data element nodes linked to each other through one or more identifiers based on the data attributes and relationship wherein a sub-network for each of the plurality of data element nodes is created as a tenant data network that includes at least one event header, at least one event data attribute and at least one event data object for enabling creation of event data models as the one or more data models.

The AI engine 111 integrates deep learning, predictive analysis, information extraction, planning, scheduling, impact analysis and robotics for analysis of the data objects to determine a data network node for ingesting the data object and data elements of the objects in the data network.

In an exemplary embodiment, the data network 106 and the data ingestion system includes a plurality of data processing bots configured to automate data extraction, data analysis, identifier determination and related processing tasks. The support mechanism 104 may include hardware components or software components or a combination of hardware and software components integrating multiple data objects through one or more applications implemented on a cloud integration platform.

In an embodiment, the software component as a bot may be a computer program enabling an application to integrate with distinct data source devices and systems by utilizing Artificial intelligence and linkedchain or graphchain implement data sources. The hardware includes the memory, the processor, control unit and other associated chipsets especially dedicated for performing recalibration of data models to carry out data extraction and relationship determination functions for data objects in the EA when triggered by the bots. The memory may include instruction that are executable by the processor for causing the processor to execute the method of data ingestion in the data network.

In a related embodiment, for enrichment of enterprise application historical data elements through mapping of the historical data elements by the cleansed and normalized dataset the support mechanism 104 of the system 100 further includes the data cleansing and enrichment tool 115. The system 100 also includes the sub-processor 112 configured for processing the received data object by analyzing before mapping with the historical data elements. The mapping of the historical data elements is executed by a bot through a data mapping script. The support mechanism 104 includes a control unit 114 encoded with instructions enabling the control unit to function as a bot for identifying and selecting an AI based dynamic processing logic using to execute one or more processing tasks for generating one or more identifiers based on analysis of the data objects. The dynamic processing logic may include serial, parallel or switching based processing logic for faster execution of the tasks.

In an embodiment, the control unit configured to connect with the one or more data objects through the identifiers wherein the control unit is configured to authenticate the data object before connecting to the network.

In an embodiment, the support architecture 104 includes the one or more IOT devices 117 configured to provide the inputs to the server on initiation of the SCM action wherein the IOT devices include sensor, mobile, camera, Bluetooth, RF tags and similar devices or combination thereof. Further, the inputs may include but is not limited to inventory management data or warehouse management data or data related to one or more item for procurement or performance data of procured items.

The processor 112 may be implemented as a chipset of chips that include separate and multiple analog and digital processors. The processor 110 may provide coordination of the other components, such as controlling user interfaces, applications run by devices, and wireless communication by devices.

The Processor 112 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 112, so as to enable near area communication of device with other devices. External interface may provide, for example, for wired communication in some implementations, or for wireless communication in other implementations, and multiple interfaces may also be used.

Referring to FIG. 1, the various elements like the support mechanism 104, the memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the memory data store 105 either alone or in various combinations may be part of a server system as other external connections.

In an example embodiment, the memory data store 105 includes plurality of databases as shown in FIG. 1. The data store 105 includes a historical data element database 105A for storing historical data elements dataset with identifier information and relationship information defining the relationship of one or more data elements with each other as part of the data network 106. The data network is configured for performing one or more processing task by utilizing a library of functions stored on a functional database 105B. Further, one or more data scripts also enable mapping of received data object related to SCM action, to historical data elements dataset by processing at least one data attribute associated with received data object based on a dynamic processing logic. The data store includes a linkedchain connector identifier database 105C, a graphchain connector identifier database 105D for storing identifiers related to data objects stored in linkedchain implemented data source architecture platform and graphchain implemented data source architecture platform. The data store/lake 105 also includes a data object identifier database 105E configured to store data object identifier information for enabling extraction of relationship information about the data objects and data elements of the data object.

The data store 105 includes a data model database 105F having one or more data models including but not limited to graph data models trained on graph structures for semantic queries with nodes, edges and properties to represent and store data, the data models database 105F also includes a plurality of training models required to process the received data for identifying relationship of data objects with historical data elements stored in the historical data elements database 105A, the data model database 105F also includes relational data model, document data model as relationship models for identification of relationships in a training model database such as data model database 105F. Further, the data model database 105F stores a plurality of data models configured for cleaning and normalization of one or more data object datasets received from multiple data sources including internal data sources of enterprise as well as any other external data source like a third-party data source. The data store 105 also includes a plurality of registers 105G as part of the memory data store 105 for temporarily storing data from various databases to enable transfer of data by the processor 112 between the databases as per the instructions of the AI engine 111 to enable processing of received data objects to identify relationship between one or more data elements of the received data object and historical data elements dataset before storing the data object as part of the data network with identifiers to enable fetching of the data object on receiving an instruction from the computing device.

In a related embodiment, the processes of analyzing data objects, identifying relationship of data elements of the data objects, processing of data attributes of the data object, mapping of data object with historical data elements, connecting the data object with node of the data network in real time to restructure the data network on receipt of a data object, etc., are processed by one or more data scripts for automating the tasks. The data scripts are backend scripts created by the bot based on the attributes of the data objects and AI processing for enabling automation of the processing tasks.

The memory data store 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, the historical data elements database 105A includes information about the historical dataset related to one or more document, file or function executed through the enterprise application. The historical elements dataset may be related to one or more nodes of the data network of the enterprise application depending on the complexity of the functions to be executed. For eg: the EA historical database 105B may include data related to past PO (Purchase order), Supplier data, Inventory data, Warehouse data, etc. Depending on the identified attributes of a received data object, the data ingestion system is configured to map the data object elements with historical data elements to ingest the data object at the correct node through appropriated connector enabling easy fetching of the data object from the network when triggered by a user action or execution of any SCM function through the EA.

In an exemplary embodiment, the data store 105 is configured for storing historical datasets of documents related to operations including inventory management, delivery management, transportation management, work order management, demand and supply planning, forecast, purchase order and invoice, real-time streams from manufacturing devices and consumer preference in regions, feeds from weather, social sentiments, economic and market indices.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only and are not meant to limit implementations of the inventions described and/or claimed in this disclosure.

In an embodiment, the received one or more data object is a document or a text data or a voice data or an image data. The data attributes include attributes associated with content of the one or more data objects. Further, the one or more data elements stored in the historical data elements database includes historical data sets with relationships.

In an embodiment, the at least one data source includes a master data, inventory, order, RFX, ASN, supplier, contracts, user, IOT device, invoice retailers, suppliers, demand drivers, distributors, clients, logistics companies, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse, contract management, shipping notes, invoice, sourcing, or any data generating module associated with a supply chain function of an enterprise application (EA).

In an embodiment, the at least one data source is a linkedchain implemented data source or a non-linkedchain implemented data source wherein for the linkedchain implemented data source the one or more objects received at the server are connected to a linkedchain architecture of the data source and an adapter having a configurator and access control module connects to the linkedchain architecture for enabling fetching of the data objects generated by the at least one data source.

In another embodiment, the at least one data source is a graphchain implemented data source with a plurality of decentralized RDF (resource data framework) graphs connected to each other and structuring a linkedchain of the RDF graphs thereby providing a self-scaling and self-regulated cross-verifying transaction framework as the graphchain disseminates the data objects in data shards between multiple nodes in the RDF graph.

Figure 1A:
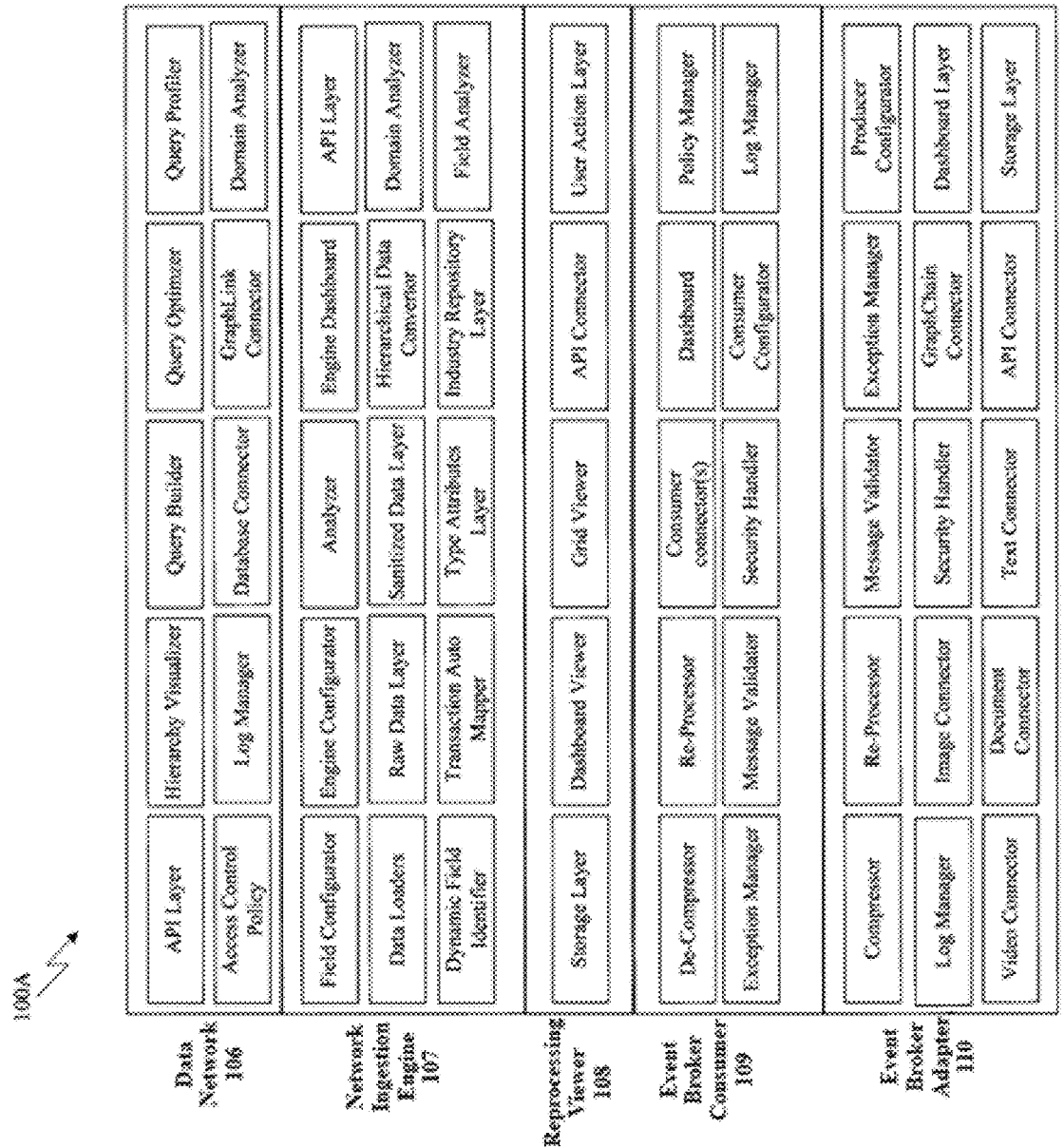
FIG. 1A is an architecture diagram with components/elements of support mechanism/architecture of the data ingestion system in accordance with an embodiment of the invention.

Referring to FIG. 1A, an architecture diagram 100A with components/elements of support mechanism/architecture of the data ingestion system is shown in accordance with an embodiment of the invention. The data network 100 includes components/elements including but not limited to API layer, Hierarchy Visualizer, Query builder, Query Optimizer, Query Profiler, Access Control Policy Log Manager, Database connector, graph link connector, Domain Analyzer etc. The Network Ingestion Engine 107 includes components/element including but not limited to Field configurator, Engine configurator, Analyzer, Engine Dashboard, API layer, Data loaders, raw Data layer, sanitized Data layer, Hierarchical Data convertor, Domain analyzer, Dynamic field identifier, transaction auto-mapper, type attributes layer, Industry Repository Layer, field analyzer etc. The reprocessing viewer 108 includes components/elements including but not limited to Storage Layer, Dashboard viewer, Grid viewer, API Connector, User Action Layer etc. The event broker consumer 109 includes components/elements including but not limited to de-compressor, Re-Processor, Consumer Connector(s), Dashboard, Policy Manager, Exception Manager, Message Validator, Security Handler, Consumer Configurator, Log manager etc. The Adapter 110 is an event broker adapter that includes components/elements including but not limited to Compressor, Re-processor, message Validator, Exception manager, Producer configurator, Log Manager, Image connector, Security handler, Graphchain Connector, Dashboard Layer, video Connector, Document Connector, Text Connector, API Connector, Storage Layer etc.

In a related embodiment, the transaction auto mapper configured to validate the one or more data objects and map the data object with the historical datasets based on the at least one identifier.

Figure 1B:
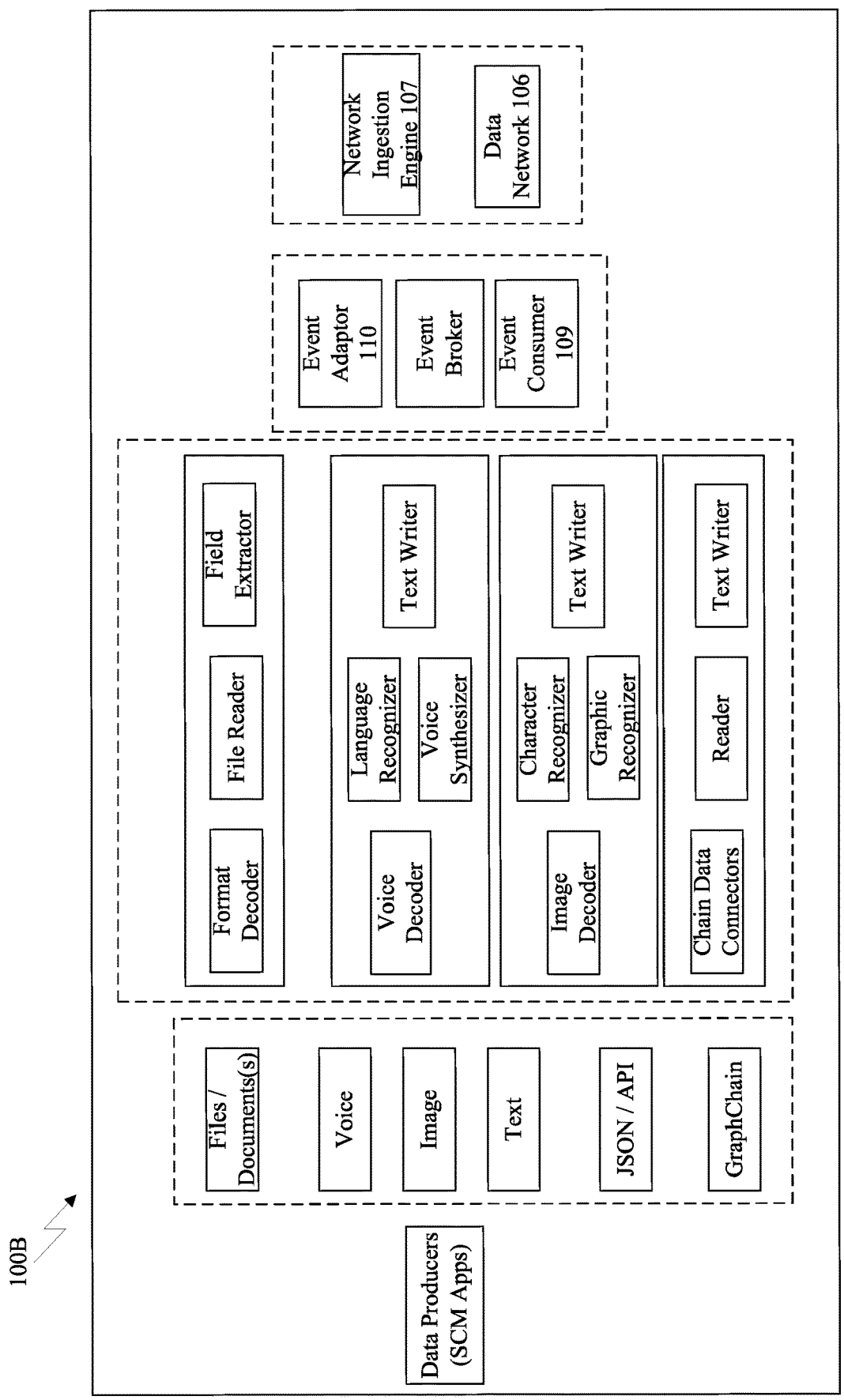
FIG. 1B is data ingestion architecture of the data ingestion system for the enterprise application in accordance with an embodiment of the invention.

Referring to FIG. 1B, a data ingestion architecture 100B of the data ingestion system for an enterprise application is provided in accordance with an embodiment of the invention. The architecture 100B includes a plurality of data producers/generators including enterprise application functions such as inventory management, invoice management, PO, contract management, or any function of the EA that generates data objects. The data objects are of multiple types including but not limited to files/documents, Voice data object, Image Data Object, text data object, JSON/API, graphchain connector data, linkedchain connector data, any identifier data including alphanumeric characters or etc. The architecture 100B core includes format decoder, file readers, field extractors, voice decoder, language recognizer, voice synthesizer, text writer, Image decoder, character recognizer, graphic recognizer, chain Data connectors, reader etc. as components/elements use to extract data elements from the data object and decoding them. The Event adapter is configured to connect to the data sources from linkedchain implemented EA systems or graphchain implemented EA systems or any other third-party data source for extracting data object to be consumed by the data network 106 to ingest data into the network using a network ingestion engine 107.

Figure 1C:
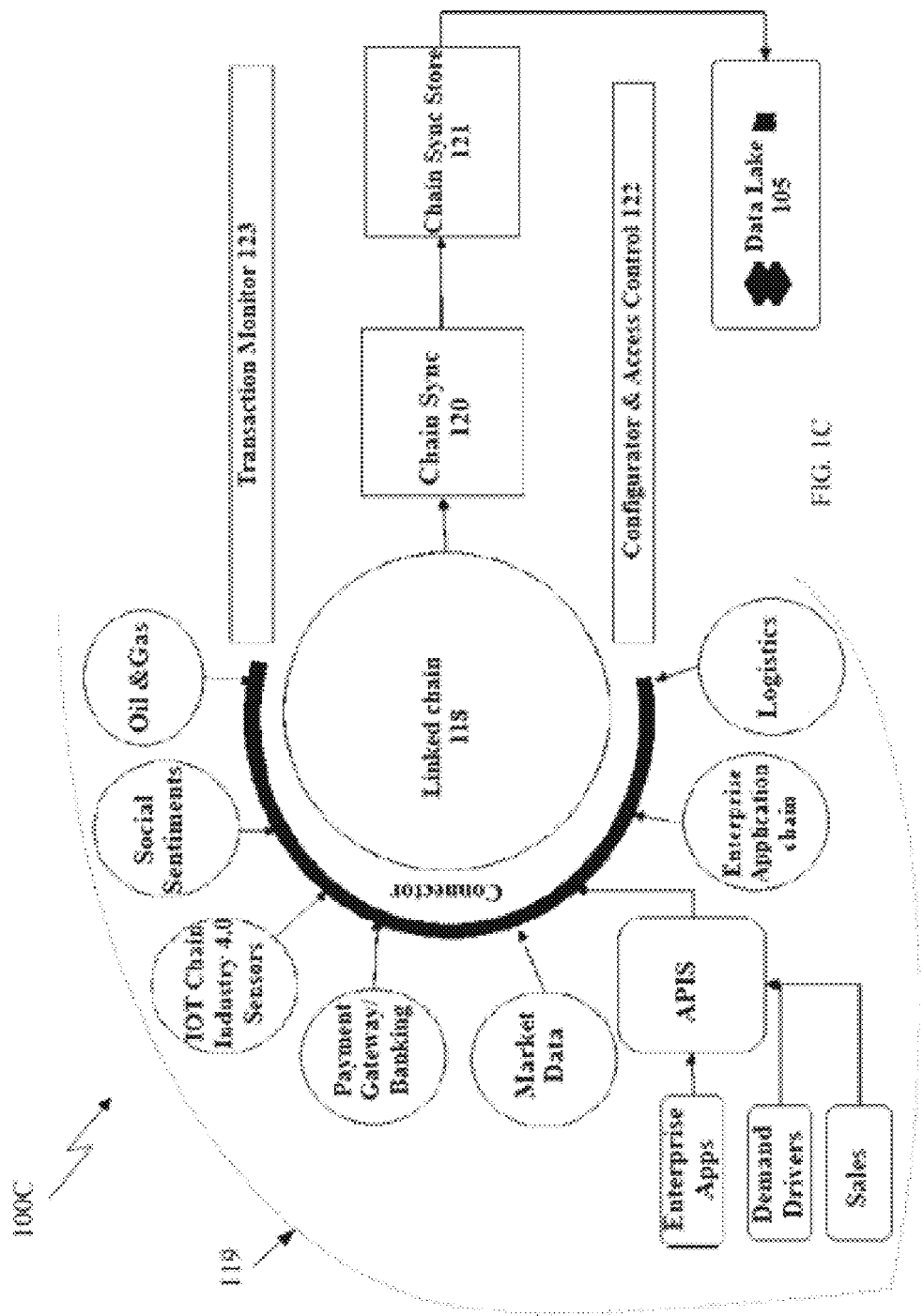
FIG. 1C is an architecture diagram of a linkedchain implemented data source in accordance with an embodiment of the invention.

Referring to FIG. 1C, an architecture diagram 100C of a linkedchain implemented data source is shown in accordance with an embodiment of the present invention. The linkedchain 118 includes a plurality of connecting elements configured for connection to multiple data objects/data sources 119 including logistic companies, enterprise application chain, APIs connected to enterprise applications, demand drivers and sales. The data sources 119 also includes retailers, suppliers, distributors, clients, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse. The linkedchain connects a linkedchain sync object 120 and linkedchain sync data store 121 to the data lake 105. The linkedchain 118 also includes configurator and access control module 122 configured for connecting the chain connector and non-chain connector the data objects after validations. The module 122 enables configuration of access control protocols for accessing data from data lake 105 of the system. The module 122 enables connecting to another network. Also, through admin portal, system administrator will be able to manage additional networks and access control. The data network system provides a transaction monitor 123 as an interface for enabling monitoring of data flow through the network when connecting data object to the one or more applications. The monitor 123 provides visibility and dashboard for end-to-end transaction connecting through APIs to monitor transaction time, compliance, tokens, transaction time etc. It will notify system administrator in case of exception.

In an exemplary embodiment, they linkedchain implemented data source system 100C includes at least one block connector associated with at least one linking object and configured for extending connection of the linking objects to a new data block of the network wherein the new data block is added to the network through a reconfiguration protocol. The block connector acts as a branch configured to perform data validation, block validation and configuration compatibility before extending connection to the new data block.

In an embodiment, the linkedchain 118 includes a chain connector element that supports connectivity to other blockchain network using standard blockchain protocols. It has an ability to connect and ingest signals from multiple types of ledgers. Connect to public and other private blockchain. It will also connect to off-chain data to fetch complete transaction. In few scenario chains will be connected through pegging.

In an embodiment, the linkedchain 118 includes a non-chain connector element that acts as a transaction builder subcomponent to chain connector is responsible to fetch data from external APIs and user interface and sign transactions before sending to linkedchain.

Figure 1D:
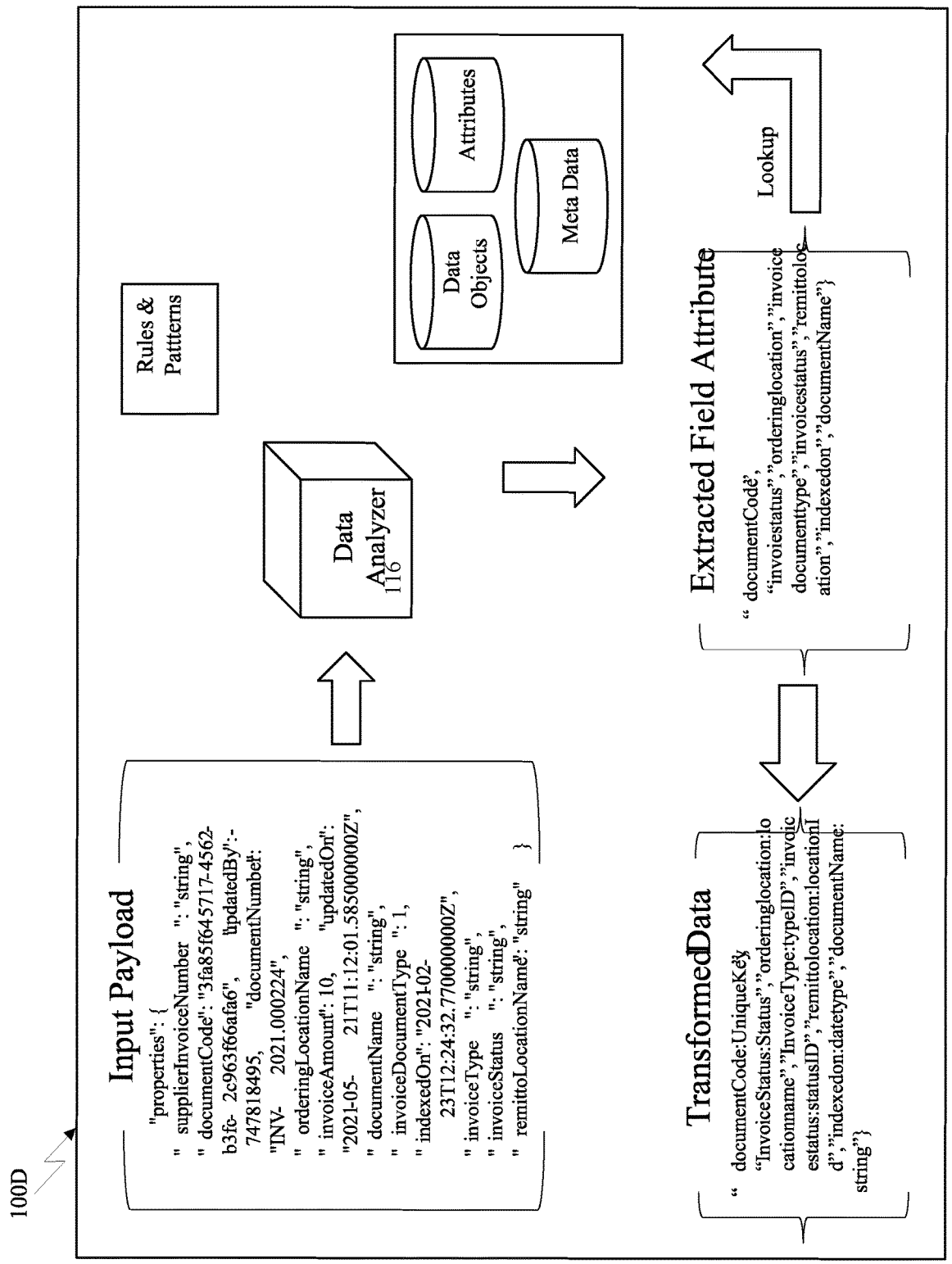
FIG. 1D is a flow diagram depicting data analyzer of the data ingestion system in accordance with an embodiment of the invention.

Referring to FIG. 1D, a flow diagram 100D depicting the data analyzer of the data ingestion system is shown in accordance with an embodiment of the invention. The data analyzer 116 configured to link the processed one or more data attribute to one or more data elements and assigning an identifier to the data object associated with the data attribute before storing in the historical data elements database. The data analyzer 116 receives input payload and extract field/data attributes from the one or more data objects before transforming the extracted attributes. Data Analyzer is an in-memory engine running on multi node servers. Engine refers to predefined rules configured for enabling the processor to process data for analysis. The rules are composed of JSON structures, allowing it easy to configure and human readable. The data analyzer receives payload in JSON format. Using JSON rule, extracts data attributes and data elements (including content, value) from data objects. Using Rule Patterns, synonyms lookup, industry terminology recognizer and historical lookup from data objects, attributes and Metadata identifies data attributes from Payload. The data analyzer transforms and creates JSON structure for network relation.

Figure 1E:
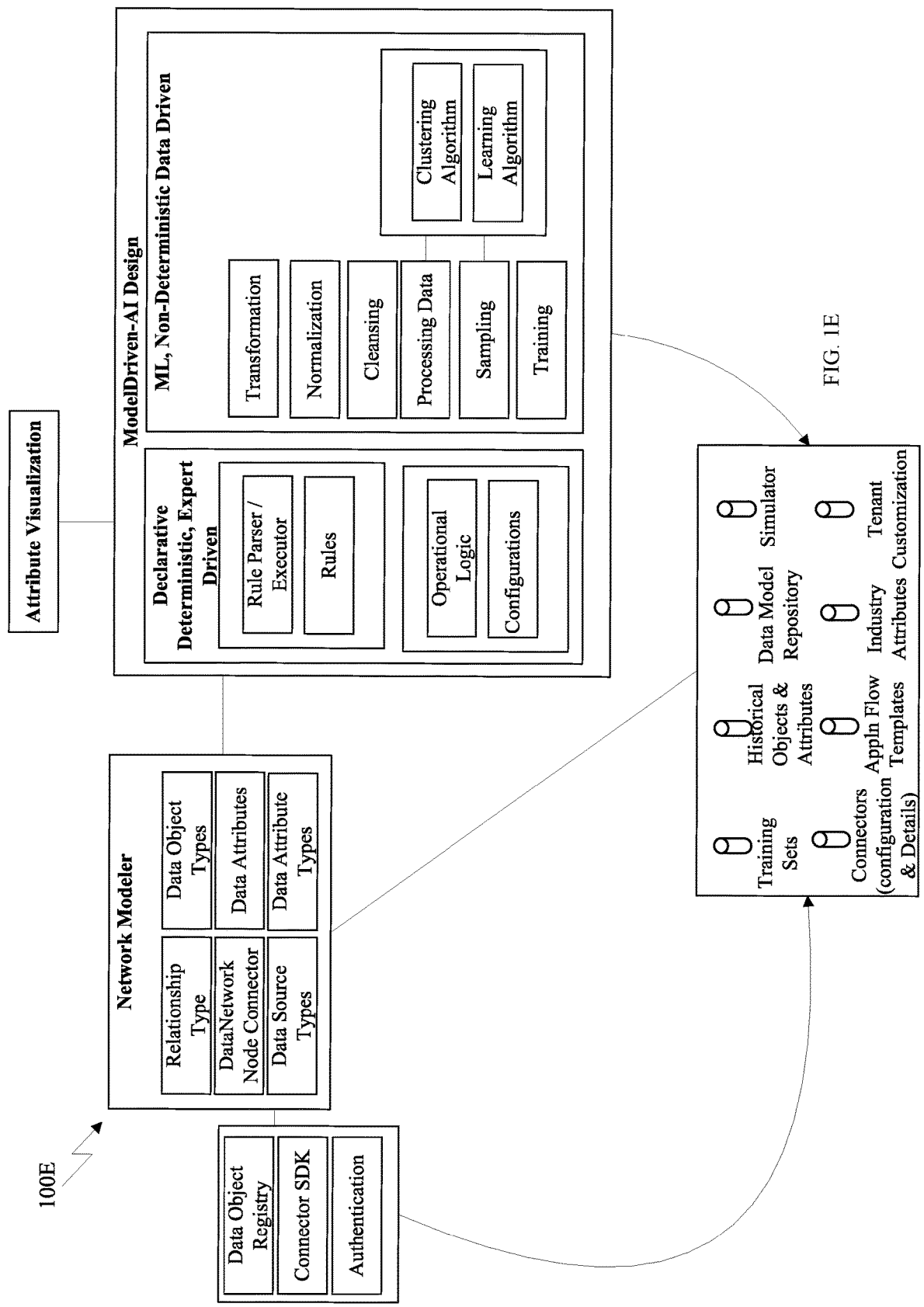
FIG. 1E is a visualization workflow in accordance with an embodiment of the invention.

Referring to FIG. 1E, a Network visualization workflow 100E is provided in accordance with an embodiment of the invention. The Network workflow visualization includes Attribute generation through Model driven AI pattern. It is responsible to generate operational process workflow like business process through AI using model driven pattern. The models are generated using combination of historical workflow and details from experts. Modeling decision of existing business process are driven manually by Subject Matter Expert. Combining Functional Industry Knowledge and its structure into rules. Decisions are better approached by using Industry Knowledge and Machine Learning (making use of Historical knowledge Data). The ML makes predictions based on the historical workflow data as predictions brings knowledge of operational/business process and interpretation and the predictions are non-deterministic.

Further, data driven model relies on larger volume of data. The data driven AI pattern is driven by historical knowledge data while deterministic are driven through expert and deep learner's engine focused on specific problem areas. The data driven AI patterns relies on smaller data sets which are accurate as they are focused on procurement and supply chain workflows and targeted for various industry verticals. The combination of subject matter expert small data for AI and big data for AI accelerates the model-driven AI workflow pattern. In the present invention a combination of subject matter expert and machine-driven training is applied simultaneously to feed small data expertise into machines. The intelligent model driven AI with Network ingestion engine leverages small data to enhance operational process and ingest data in the network.

In a related embodiment, the model-driven AI flow enables users to access data in a unified manner regardless of the underlying data store. Data store queries (e.g., relational, or file systems) are significantly streamlined for structuring the workflow. The essential aspects of time and space, data normalizing, versioning, and tracking are all handled by the data network.

The Network visualization includes processing of functional industry knowledge with declarative and deterministic AI which deals with controlled section of operational/business logic provided by industry experts. Further, the workflow includes interpretation of regulations and policies to be applied to business processes.

In another related embodiment, the Network workflow visualization block 100E includes a Network modeler that is responsible to generate notations and defines data network elements as per trained models saved in the repository. The Network modeler manages various relationship types, data object types, data network node connector, data attributes, data source types and data attribute types, responsible to integrate these components/elements and use tools repository to structure the data network.

Further, the data network includes compliance process with validation of end-to-end flows and is responsible to verify and simulate the flow as per the data model. The compliance process identifies outliers and generates alerts along with replaying the events. Furthermore, the network workflow includes a user block that generates notations, identifies blocks requiring user intervention, defines start and end of the flow, and connects user action to business events.

In another embodiment, the Network workflow visualization 100E includes service process that generates definition of microservice blocks, runs in-memory in the network engine and have a single responsibility. The service processes include sub processes and is high performant. Further, the workflow visualization 100E includes functional process as a critical block with ability to connect with code server for custom implementation. It invokes API. Further decision process includes decision blocks that are generated through a rule engine.

In one embodiment, the one or more data objects includes event data object, state data object, action data object and access control data objects, stakeholder types, rule expression data object, master data objects. The event data objects, and action data objects are mapped to endpoints of the API. Also, the event data objects are connected to action data objects and action data objects are associated to state data objects.

In another embodiment, the one or more data objects includes application functional data objects such as Taxonomy associated to a document, sub class of the document (contract type, PO type, Invoice type, business unit, line of business, ship and bill to location, item category, stakeholder types) document Types, Application Types, Supplier location, Region of business, taxation attributes, Line attributes, clause type, approval type, and document value (invoice amount, contract amount).

It shall be apparent to a person skilled in the art, that the data objects listed in the application are examples relating to data objects for data network in Supply chain management enterprise application. The list provided is not exhaustive and may include other data objects that are withing the scope of the current disclosure related to supply chain application.

In an embodiment, the system 100 (Ref. FIG. 1) of the present invention provides a historical data elements database configured for storing historical dataset wherein the connections of the data elements in the database are structured based AI based model-driven flows incorporating reference to one or more identifiers to link the data elements within supply chain.

In an embodiment, the data network 106 includes a linkedchain and graphchain connector for integrating blockchain like services with the one or more SCM application and interaction with one or more data objects in the EA. Further, Configurator services are used to include third party networks or data sources managed by domain providers.

In an embodiment, the present invention uses GPUs (Graphical processing units) for enabling AI engine to provide computing power to processes humongous amount of data to structure the data network.

In an exemplary embodiment, the AI engine 111 employs machine learning techniques that learn patterns and generate insights from the data for enabling identifying relationships of data attribute of the data objects with one or more data elements of the historical data elements and automate operations. Further, the AI engine with ML employs deep learning that utilizes artificial neural networks to mimic neural network. The artificial neural networks analyze data to determine associations and provide meaning to unidentified or new data objects.

Figure 2:
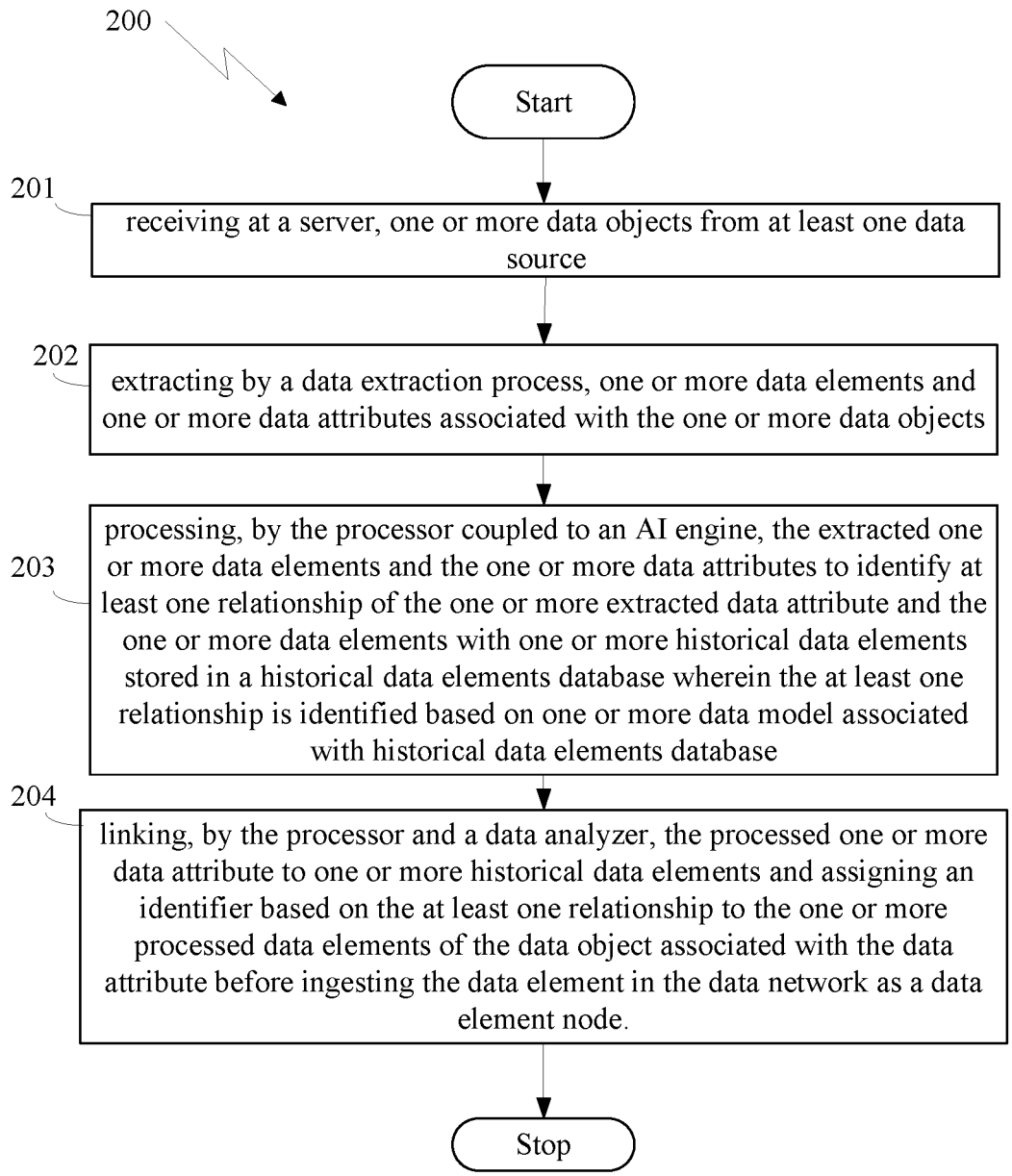
FIG. 2 is a flowchart depicting a data ingestion method in accordance with an embodiment of the invention.

Referring to FIG. 2, a flowchart 200 depicting a data ingestion method is provided in accordance with an embodiment of the invention. The method includes the steps of 201 receiving at a server, one or more data objects from at least one data source. In step 202, extracting by a data extraction process, one or more data attributes associated with the one or more data objects. In step 203, processing the extracted one or more data attributes to identify at least one relationship of the one or more data attribute with one or more data elements stored in a historical data elements database wherein the at least one relationship is identified based on one or more data model associated with historical data elements database. In step 204, linking the processed one or more data attribute to one or more data elements and assigning an identifier to the data object associated with the data attribute before storing in the historical data elements database.

In an embodiment, in response to determination of the one or more data attribute or the one or more data element as a new data attribute or a new data element, the one or more data element node is ingested in the data network as a new data element node without any identifier providing relationship from the historical data element database.

In a related embodiment, the data extraction process for extracting one or more data attributes associated with the one or more data objects includes the steps of identifying a type of data object and sending the data object to at least one data recognition training model for identification of the one or more data attribute wherein the data recognition training model processes the data object based on prediction analysis by a bot for obtaining the data attribute with a confidence score.

In a related embodiment, a document recognizer utilizes unsupervised learning to understand a layout and relationship between fields and entries in the data object wherein the bot clusters the data objects by type, discovers keys and associates value to keys before sending the keys to the identifier.

In an embodiment, for a pdf or image type data object the data extraction method includes the steps of drawing a bounded box around the identified data attribute by a region of interest script, cropping the at least one identified data attribute in the drawn box, extracting text data from the data attribute by optical character recognition and validating the text data after processing through an AI based data validation engine.

In an embodiment, the data ingestion method includes creating a training relationship data model from a data relationship tool by retrieving the historical data elements from the historical data elements database, cleansing the historical data elements for obtaining normalized historical data, extracting a plurality of categories from the normalized historical data for creating taxonomy of relationships associated with the one or more data attributes, fetching a plurality of code vectors from the normalized historical data wherein the code vectors correspond to each of the extracted categories of the relationships associated with the one or more data attributes, extracting a plurality of distinct words from the normalized historical data to create a list of variables, transforming normalized historical data into a training data matrix using the list of variables, and creating the training relationship data model from the classification code vectors and the training data matrix by using the machine learning engine (MLE) and the AI engine.

In a related embodiment, the relationship between the one or more data attribute and the one or more historical data elements is determined dynamically as the one or more data attribute for each of the one or more data objects may be different. The determination of the relationship is dependent on the data relationship tool which creates at least one training relationship data model for processing the received data object to determine the relationship.

In a related embodiment, the method further includes reading the training data matrix and the plurality of code vector, applying relational data model (RDM) algorithms to train one or more relational data model for the normalized historical data by using machine learning engine (MLE), applying document model (DM) algorithms to obtain document data models by using machine learning engine (MLE), applying graphical data model (GDM) algorithms to obtain graphical data models by using machine learning engine (MLE), and saving RDM, DM and GDM models as the training relationship models for identification of relationships in a training model database.

In an embodiment, the data ingestion method includes creating one or more application data models by the processor coupled to the AI engine for each application executing one or more supply chain function wherein a templatized data mapper processes a template that includes application identifiers for classifying one or more application data attributes against the one or more data attributes of the data network. The template includes the application data attributes, master data reference, transactional data reference wherein the templatized data mapper is configured to update the template in real time to ensure the application is linked to the data network.

In another embodiment, the invention enables integration of Application Programming Interfaces (APIs) for plugging aspects of AI into the dataset relationship identification and prediction for structuring the data network.

In an exemplary embodiment, apart from application data source, the data network is exposed as API for third party digital platforms and applications. The API is also consumed by bots and mobile applications.

In an embodiment, the data network is structured with identification of relationships in data objects created in EA through multiple SCM functions including CLM, Inventory management, warehouse management, Cycle Counting, Material transfer, Pick List, warehouse management, Order Management, invoice management, Good Receipts, Credit Memo, service confirmation and timesheet, Goods Issue, Return Note, requisition, Demand and Supply planning, Vendor Performance and Risk Management, RFX, Auction, Project Management, Quality management, Forecast Management, cost modeling, purchase order and sales management, receivables, work order management, Supplier Order Collaboration, Control Tower, Budgeting, Item and Catalog Management.

In an exemplary embodiment, the method of the invention includes generating a plurality of fixtures created for performing the at least one operation by utilizing a library of functions stored on a functional database where a controller is encoded with instructions enabling the controller to function as a bot for generating the fixtures. The plurality of fixtures are backend scripts created by the bot based on the at least one operation, data objects and AI processing for enabling automation of multiple operations by the controller to structure the data network. The AI based processing includes a processing logic that integrates deep learning, predictive analysis, information extraction, planning, scheduling, optimization and robotics for processing the data objects to identify relationships.

Figure 3:
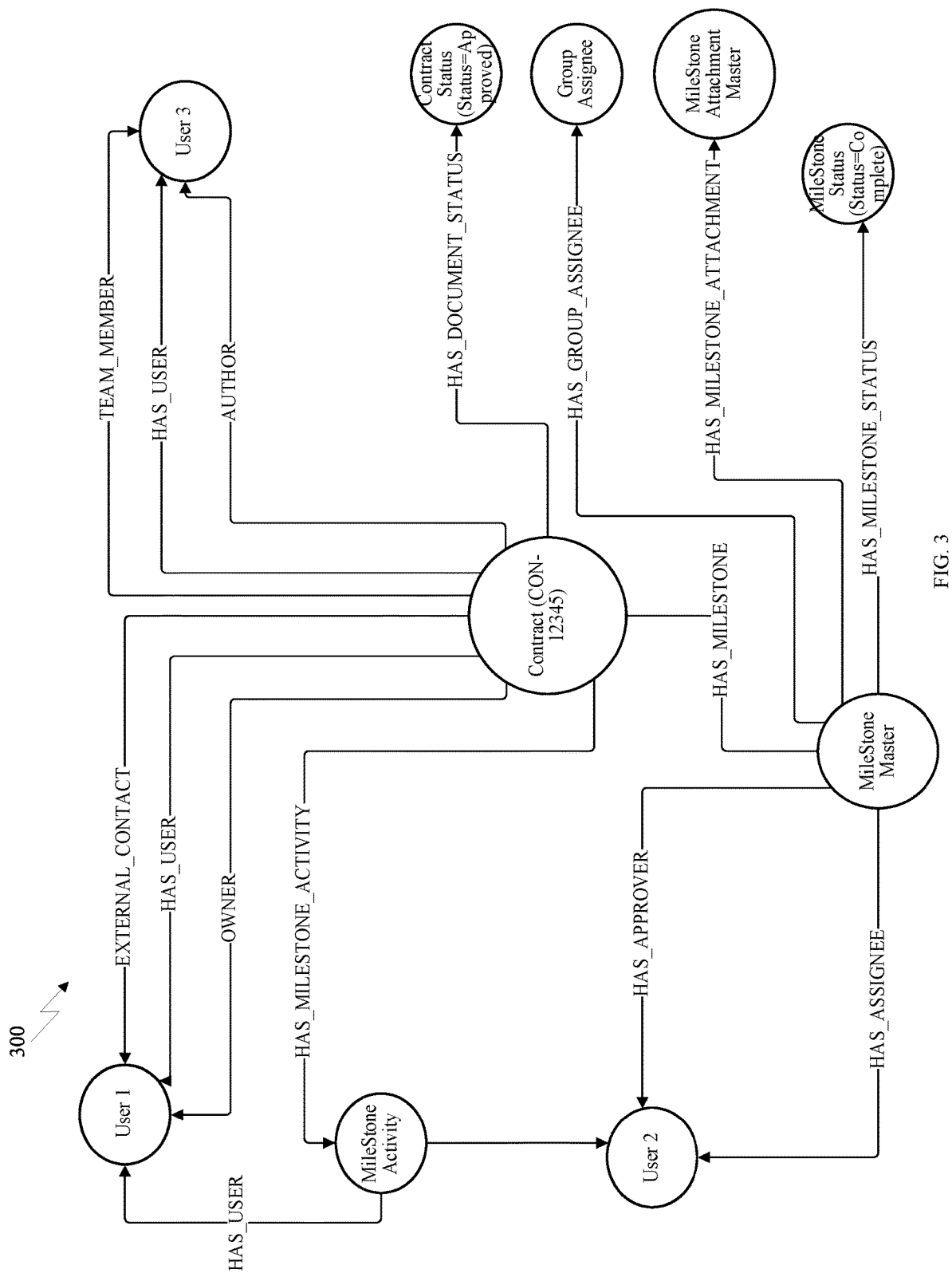
FIG. 3 is a data network with contract lifecycle management function data objects and nodes of the enterprise application in accordance with an example embodiment of the invention.

FIG. 3 is a data network 300 with contract lifecycle management (CLM) function data objects and data element nodes of the enterprise application in accordance with an example embodiment of the invention. The data network 300 provides representation of CLM data object having various data element nodes of specific data object say a contract, with data attributes like contract number and data element as CON-12345. The Network 300 also includes Status (Approved), Contract Milestones, Status of each milestone, and Users (user 3) associated for this contract.

Figure 4:
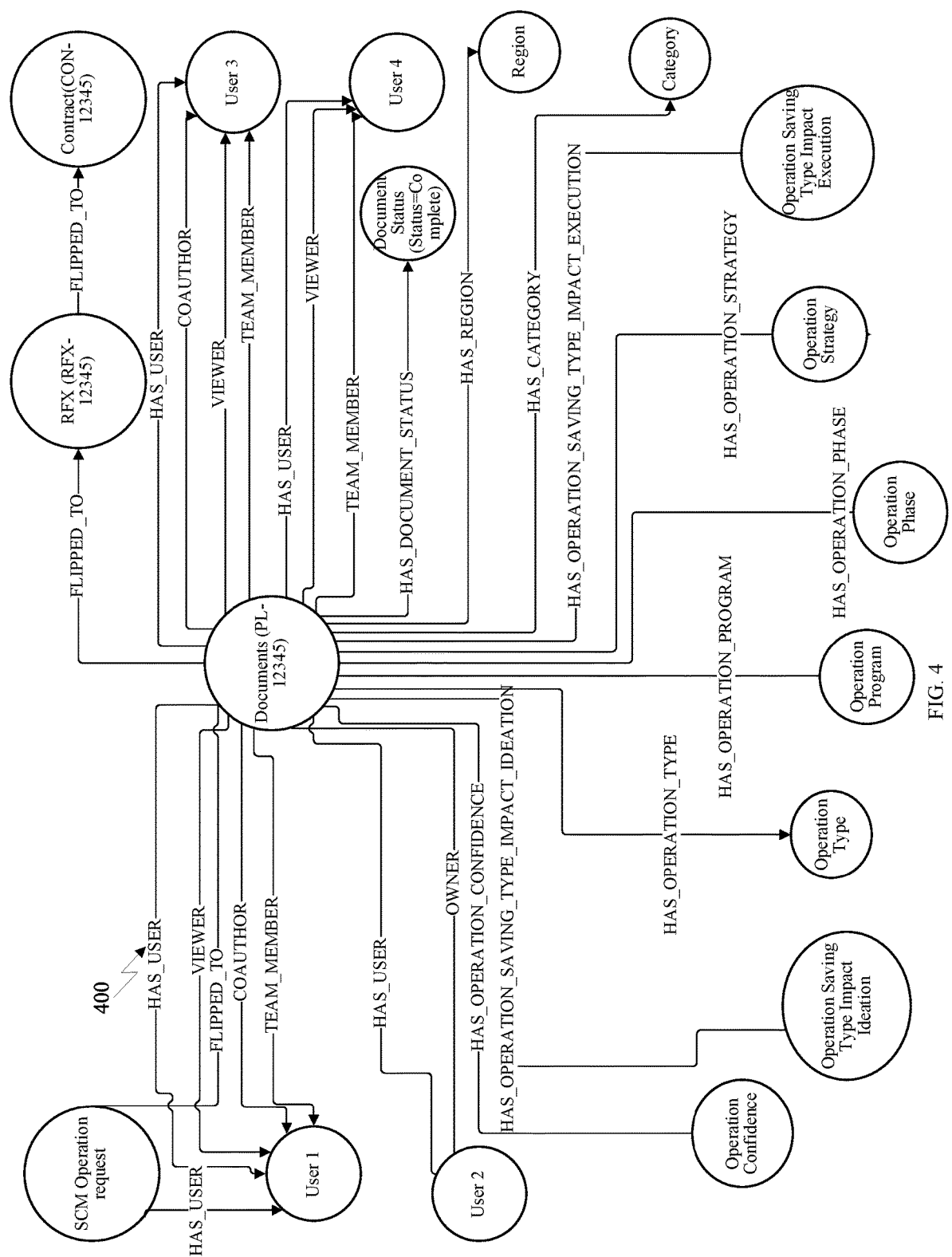
FIG. 4 is a data network with a SCM operation data elements and nodes of the enterprise application in accordance with an example embodiment of the invention.

FIG. 4 is a data network 400 with a Project Life Cycle for SCM operation data elements and nodes of the enterprise application in accordance with an example embodiment of the invention. Since, Supply Chain Project life cycle has various stages, the network 400 represents Project (PL-12345) and its dependence with other data objects like RFX (RFX-12345) and Contract (Con-12345). Also, it provides information about User and Status.

Figure 5:
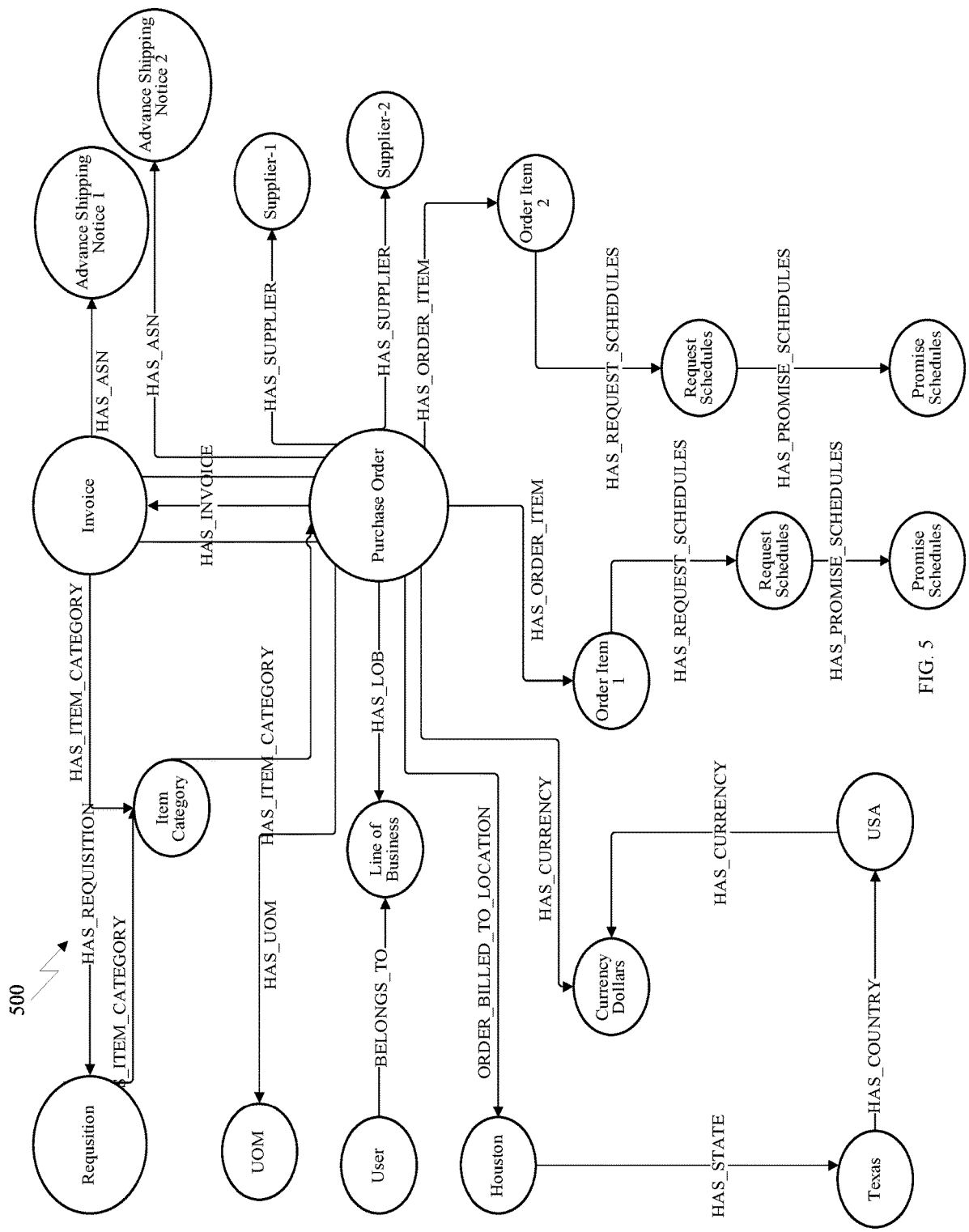
FIG. 5 is a data network with Purchase order function data elements and nodes of the enterprise application in accordance with an example embodiment of the invention.

FIG. 5 is a data network 500 with Purchase order function data element nodes of the enterprise application in accordance with an example embodiment of the invention. The data network 500 provides one or more data elements of the Purchase order data object. The one or more data elements of the data object includes information such as order item, line of business, region etc. These data elements are analyzed before ingesting them as data element nodes of the data network.

Figure 6:
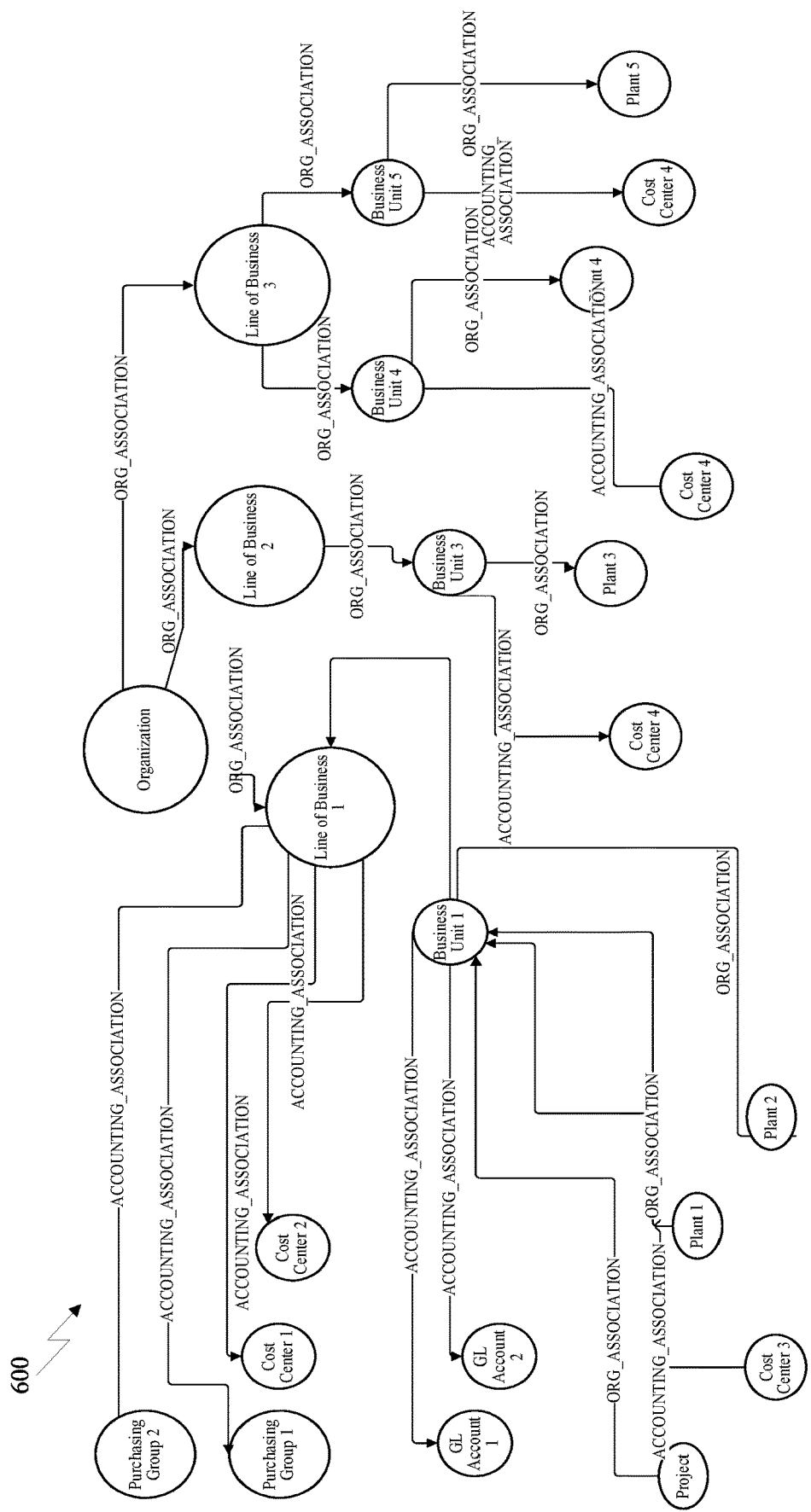
FIG. 6 is a data network with Company Organizational hierarchy structure in accordance with an example embodiment of the invention.

FIG. 6 is a data network 600 with Company Organizational hierarchy structure in accordance with an example embodiment of the invention. The above data network 600 illustrates Company Organizational Hierarchy in form of a Graph Network. Organizational Hierarchy is more complex hierarchical data unless the company is managed by a single person and with a smaller number of employees. However, in cases where the company is huge with multiple operational units, handling this hierarchy requires a graph structure. Organizational Structure is a network comprising of relationships with 1 to many and that too having nth level nested information. Network traversing & extracting information from a graph network at any level of the hierarchy is quick.

Figure 7:
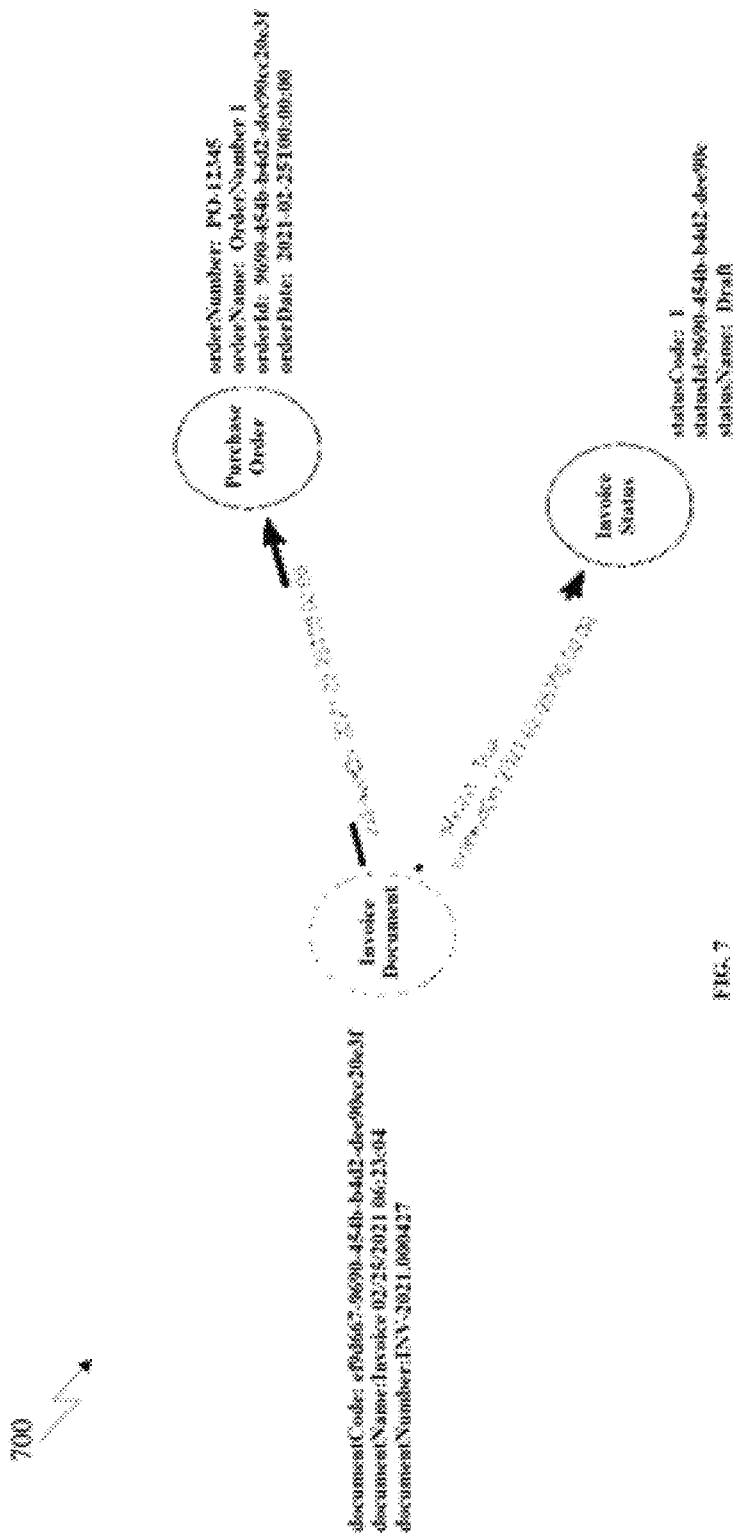
FIG. 7 is an invoice graph data network model of the enterprise application in accordance with an example embodiment of the invention.

FIG. 7 is an invoice graph data network model 700 of the enterprise application in accordance with an example embodiment of the invention. Since, data in a data network is coming from multiple data sources, data authenticity, data quality, data governance become the primary aspect for data ingestion into data network. Operational and technical decisions rely on trusted data for analysis, so data must be from trusted data source, information within the data should be trusted one in terms of the data should be accurate, required data should be available within the transaction data. Similarly, unwanted data or data without any significance to data network should be restricted from entering the data network. This is explained with the example of invoice graph data model 700 where the output is represented in the data network. So, we can observe relevant attributes of the input model have been used to form the Invoice Network and some of the properties like version, culture is ignored. The input data in this case is self-sufficient to form the Network, whereas in some cases it might happen that the input data might have some attributes missing due to which we may not be to form a suitable network, such data must be ignored, logged and has to be notified to the respective producer. Further, the input data can be huge in terms of numerous attributes as well as data can be in a nested structure up to nth level. The Input data is processed to form multiple nodes and relationships within the Data Network.

Figure 8:
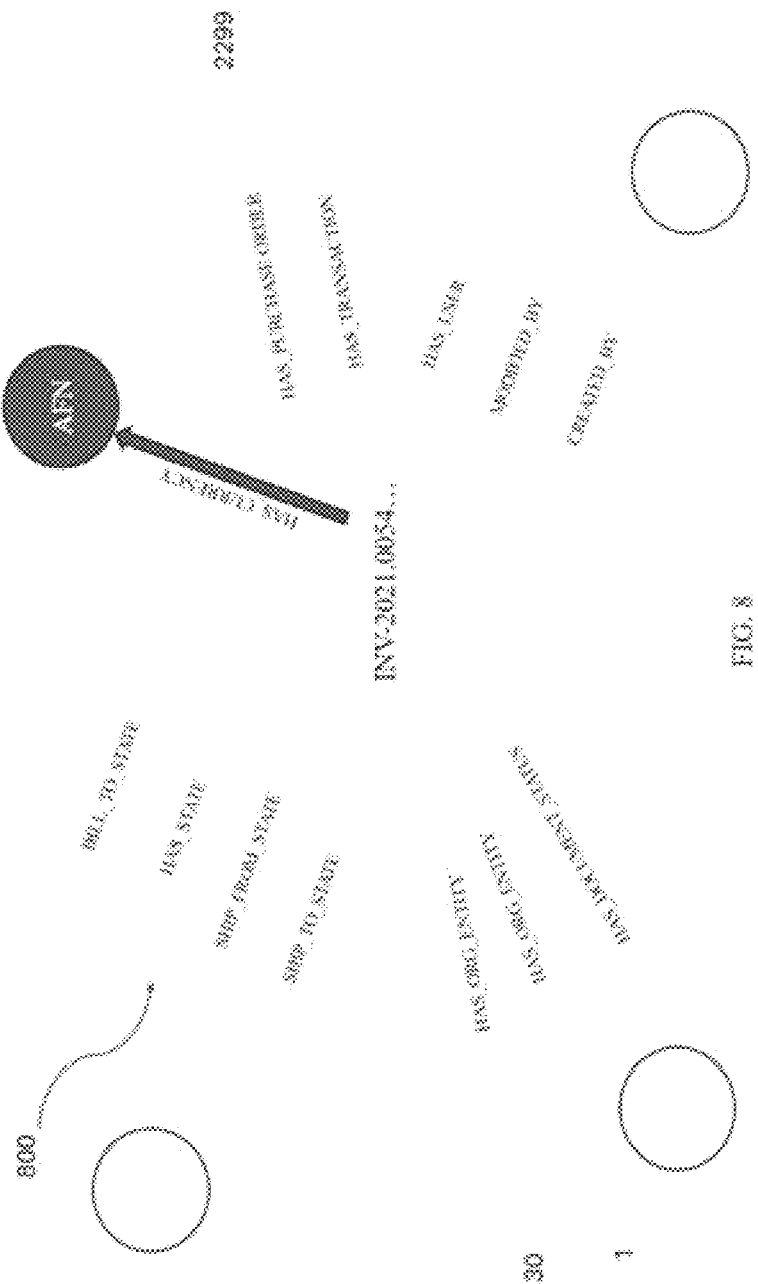
FIG. 8 is a hierarchical graph data model showing relationships in Invoice function data elements and nodes in accordance with an example embodiment of the invention.

FIG. 8 is a hierarchical graph data model 800 showing relationships in Invoice function data elements and nodes in accordance with an example embodiment of the invention. The data model 800 indicates an Invoice document network having relationship with purchase order represented as "HAS_TRANSACTION" (a generic relationship type for transaction-transaction network) & "HAS_PURCHASE_ORDER" (a defined relationship type with Purchase Order). Generic relationship types can easily identify transactional relationships whereas defined relationship types can help in identifying which documents are connected to a specific document type, like in case its Purchase-Order. It can also be observed that the invoice documents have relationships with User Master via "HAS_USER" (a generic relationship with USER Master), "CREATED_BY" (indicates that invoice document has been created by the specified user 700219610 . . . ), "MODIFIED_BY" (indicates that invoice document was modified by specified user 700219610 . . . ), Invoice Document having relationship with "Organizational Entities" which in itself nth level hierarchical network. The relationship type "HAS_ORG_ENTITY" clearly indicates document relation with organizational entities. Similarly invoice document relationships with master's like State, Currency, status is represented in their own specific relationships. This hierarchical network grows as the data starts flowing continuously thus forming networks with the existing network as well as creating new ones during ingestion.

FIG. 8A shows a table 800A showing invoice data mapping template in accordance with an example embodiment of the invention. The data ingestion system enables templatizing of the application data model. Every application has its own data model stored in different data sources whether it be SQL, NOSQL or file-based systems. Since their data model wouldn't fit directly within the Data Network Graph Model, we must simplify & segregate application data model in to a templatized data mapping sheet specifically designed for Data Network. The template comprises of unique identifiers which helps in classifying the attributes within the application model against specific attributes in Data Network Model. The template may include application data attributes, master data reference, transactional data reference. For eg: the invoice template constitutes of attributes, considered for data network, master data reference and transactional data reference. For the attributes the application model is presented in form of JSON de-normalized data structure. This JSON data model is presented on the template with each record in a template indicating the JSON property/attribute. The template can be used to represent both flat & nested JSON data model. For considered for Data Network, attributes which are relevant, play a significant part in decision making, having relations with different application model should only be considered as part of the data network. For Master Data Reference, the master data conceptually refers to data or core entities that provides context to transactions and which is consistent and has set of unique identifiers and extended attributes. The most found masters are Users, Organizational Structure, Location, Suppliers etc. Master Data are physically found scattered across business in varied applications either duplicated for each application or being stored as a Central Data Store as Master Data Management concept. In both scenarios the Master Data is kept in isolation in a separate store with no relation to transactional data. Considering Master Data as part of Data Network helps in bringing both transactional data & master data together and forming a network thus identifying the common network between transactional data who share the same Master. Master Data can flow into Data Network from an isolated Single Master Store or from a Master Data Management store. For e.g. An Invoice document will have user master referenced within its model through attributes like CreatedBy, ModifiedBy, Owner, Author etc. So, User Master data referential information must be mentioned against these above listed attributes within the Invoice Data Mapping Sheet. This information will be used while forming a master relationship between an Invoice document & its respective master's within the Data Network. For transactional Data Reference, application Data Model might have some references to other applications through some reference keys/attributes included as part of application data model. For e.g. In Supply Chain process, a Purchase Invoice is created only after buyer has provided the vendor with a purchase order, so an Invoice Document Model will have references to single or multiple Purchase Order document with Purchase Order being a separate application. Data flowing from different applications are also termed as transactional data, an attribute/property of an invoice transaction will have a reference to a purchase transaction, so this transactional data reference must be mentioned against that attribute and to which transactional model it's been referred to. This information will be used while forming a transactional relationship between an Invoice document & its respective Purchase Order document within Data Network. The data mapping sheet is thoroughly processed by the AI engine for creation, and it is also maintained and updated for any change in Application Data Model or any change with respect to its referential transactional & master data model. This sheet is one of the most important documents for enabling the concerned Application to be part of the Data Network.

In an exemplary embodiment, the one or more identifiers of the data object in a data network includes dynamic filed identifiers. These identifiers validate data attributes from domain model (metadata repository) predefined as per historical data and domain expert. The network engine matches attributes from incoming payload. In case of any unseen data attribute is found in a data object, engine will add new attribute to the type mapping repository (meta data repository) and a Unique ID will be generated. This behavior can be configured, by setting the dynamic parameter either to ignore new fields or strict by throwing an exception if an unknown field is encountered. The engine will primarily execute on following priorities on data attribute name: Exact Match, domain model synonyms, ranking and scoring, best field, and fuzziness. In case attribute matching engine does not provide relevant result, data analyzer will execute sample algorithm and cross validate against historical data sets.

Figure 9:
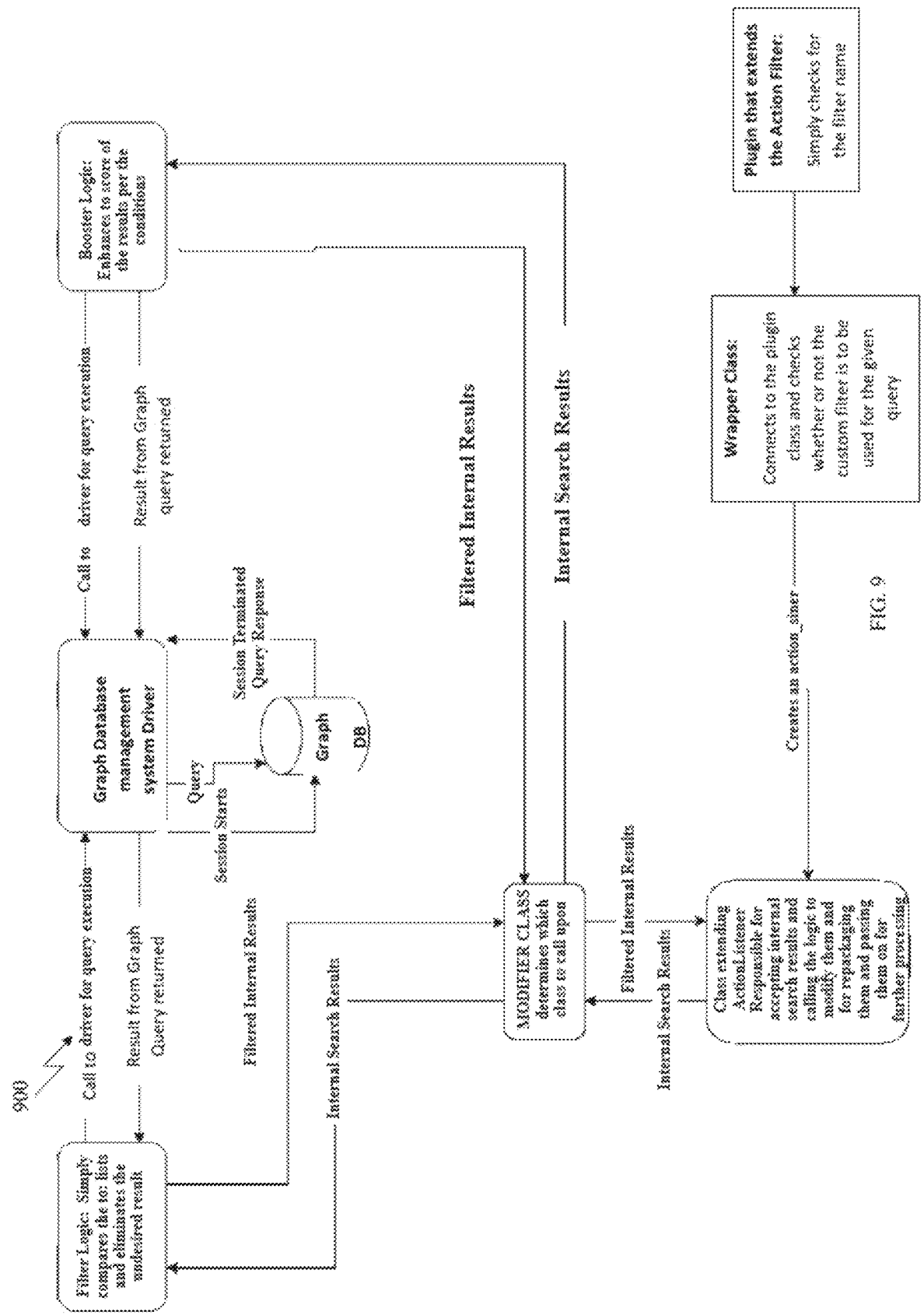
FIG. 9 is a data tree flow diagram for the data ingestion system in accordance with an embodiment of the invention.

FIG. 9 is a data tree flow diagram 900 for the data ingestion system in accordance with an embodiment of the invention.

The data tree use cases within a single customer domain can be provided as below:
Use Case 1: Display document level track status from projects→sourcing→contracts→Req→orders→receipts→invoices→credit memo.
Use case 2: Capture line level traceability, linkage of lines across all documents, from sourcing→contracts→catalog→req→orders→receipts→returns→invoices→creditmemo→payments
Use case 3: Using the linkage created above in use case 2, identify the line status in PO and allow or disallow receiving or invoicing. If the line is closed for receiving/invoicing, this information can be used by receipts/invoices to allow or disallow receiving or invoicing
Use case 4: Predict basic exceptions like quantity mis match, unit price mismatch or line total mismatch in real time when submitting an invoice.
Use case 5: Track item price change, provide tool tip on the order/invoice when the price is lower than the ordered price.
Use case 6: Track inventory count in real time
Use case 7: Use the linkage data for displaying following counts against a PO/Contract line including Total receipts/received quantity, Total returns/returned quantity and Total invoices/invoiced quantity/invoiced value.
Use case 8: Suggest ad hoc approver names based on the earlier approvals or relationships with the system defined approvers
Use case 9: Extract intelligence on total cycle time or payment terms for a specific type of invoices or for a supplier in real time.
Use case 10: Suggest order contacts for invoices to be routed to for resolution based on the historical relationships with the items/supplier/plant/category
Use case 11: Identify user workload across the domain, based on all the documents related to a user.

The data tree use cases across multiple customer domain can be provided as below:
Use case 1: Country/Region/industry specific invoice count/cycle time in real time.
Use case 2: Supplier payment term across multiple customers/industry in real time.
Use case 3: Item price fluctuations across multiple customers/industry in real time.
Use case 4: Tracking contract manufacturing use cases (order quantity/shipping status/manufacturing status/warehouse status etc.,) across tier 2 or tier 3 suppliers in real time.
Use case 5: Propose duplicate vendor or vendor consolidation based on common attribute like address or order contact.

Figure 10:
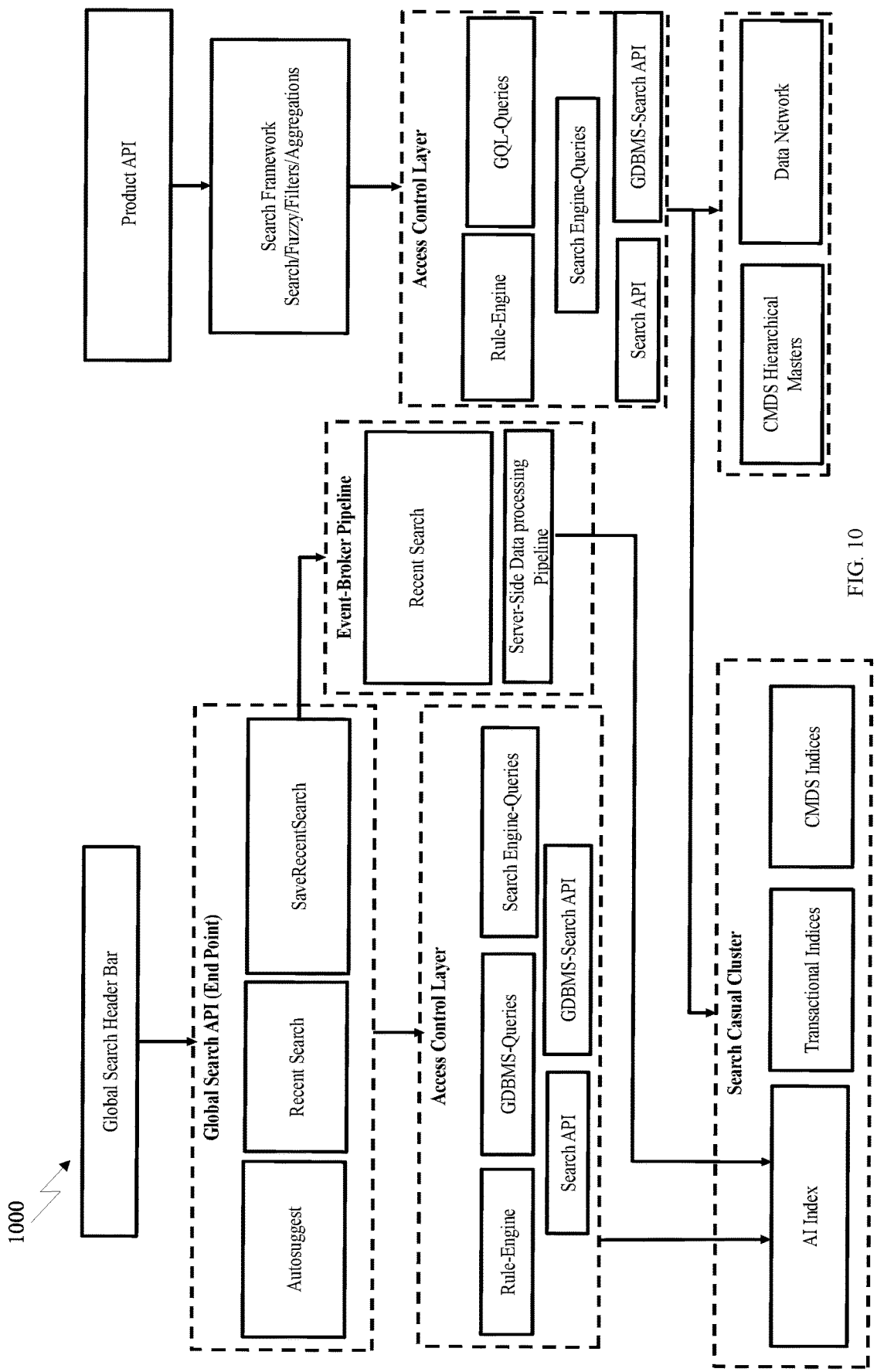
FIG. 10 is block diagram of the search engine operation for data ingestion system in accordance with an embodiment of the invention.

FIG. 10 is block diagram 1000 of the search engine operation for data ingestion system in accordance with an embodiment of the invention. The block diagram indicates how Search Engine works across applications with focus on providing relevant search results based on the intent, context and user profile. The application architecture includes a data layer where, data generated across application from varied sources are simultaneously ingested into search engine which primarily acts as a Search Store for Suggestion, Relevancy, boosting etc. The data network provides a unified view of all transactional data & master data of all applications/products for a specific entity, and which here acts as a mechanism to derive the access of a user for a specific document or list of documents based on the relationship shared between users, organizational hierarchy, accounting hierarchy, different transactional & master data, co-occurrence etc. The application also includes a Service Layer which is categorized into modules based on the context & intent of the users which is searching for the data. User can either opt for just suggestions, or recent search or performing an advance filter based on multiple criteria. This Layer helps in binding the respective endpoints of various modules together to give user the desired response. Proactively users are only presented data based on their profile using a mandatory access control layer which does a qualification of documents based on user contexts and its organizational hierarchy.

Figure 11:
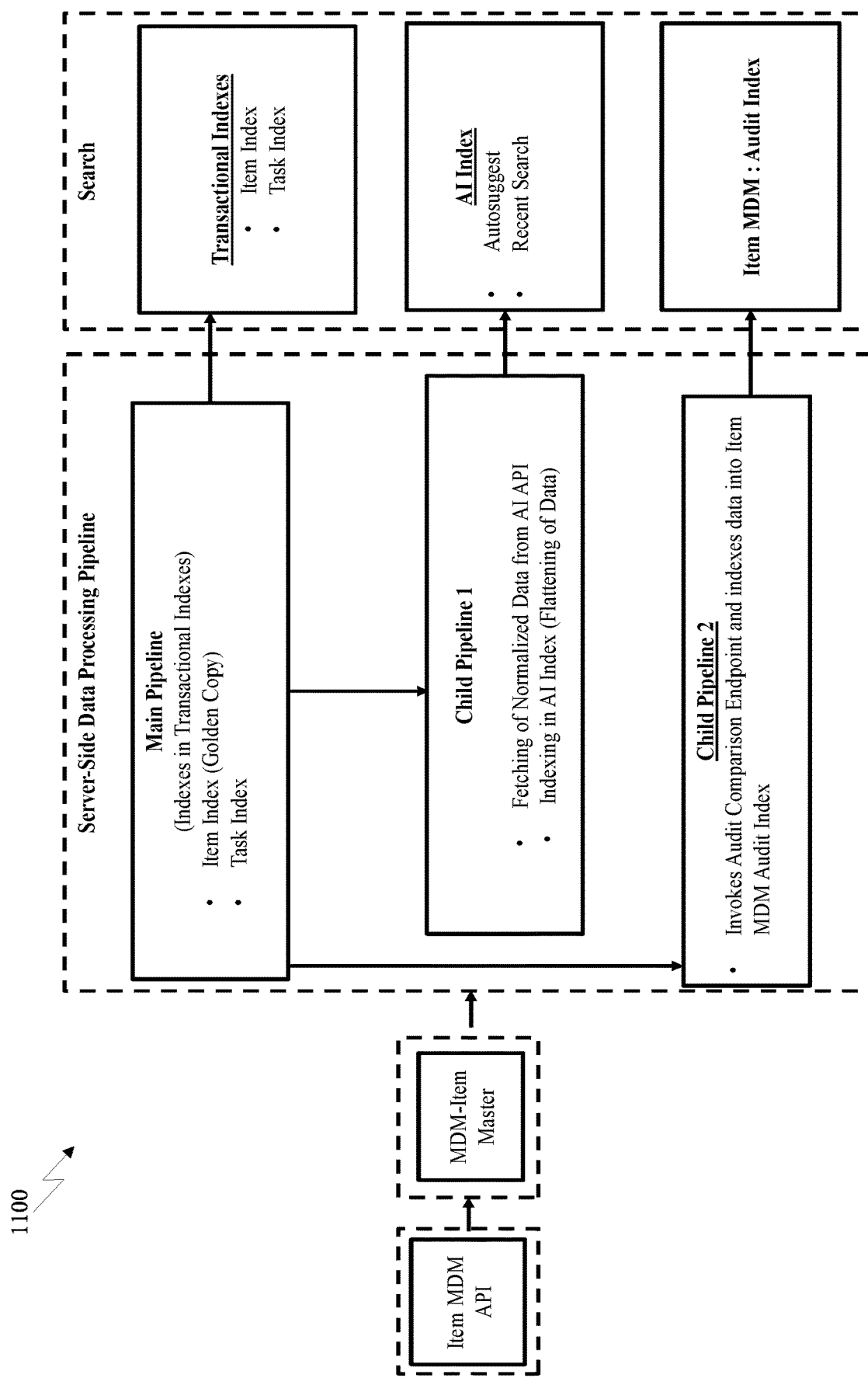
FIG. 11 is a flow diagram multi-pipeline implementation for ingestion in accordance with an embodiment of the invention.

FIG. 11 is a flow diagram 1100 multi-pipeline implementation for ingestion in accordance with an embodiment of the invention. The flow diagram 110 depicts a scenario of an ETL Pipeline where in data is getting extracted from a messaging Queue, transformed during various processes and ingested into their data targets. This scenario describes a use-case where, data extracted once can be transformed in multiple process or pipelines and pushed to multiple databases. The data ingestion system includes distributed event streaming platform which is being used as Messaging Broker by all applications for pushing their respective transactional data on respective Broker topics, so that respective consumers who are interested in the data can subscribe to the relevant topic to consume the data based on their appetite. The Consumers can directly subscribe to a topic, or they can rely on robust Consumer Application such as server-side data processing pipeline to consume the data from a topic, transform and make the data ready so that it fits into their respective schema. The server-side data processing pipeline dynamically ingests, transforms, and ingests your data regardless of format or complexity. In current scenario, multi pipeline strategy is being utilized to transform data. The transformation pipelines are connected to one another where output of a pipeline is being utilized as an input to another, and respective pipelines are ingesting data separately to different databases. In current scenario, data is being transformed and being ingested into multiple indices of search engine using multi pipeline strategy with onetime data extraction.

Figure 12:
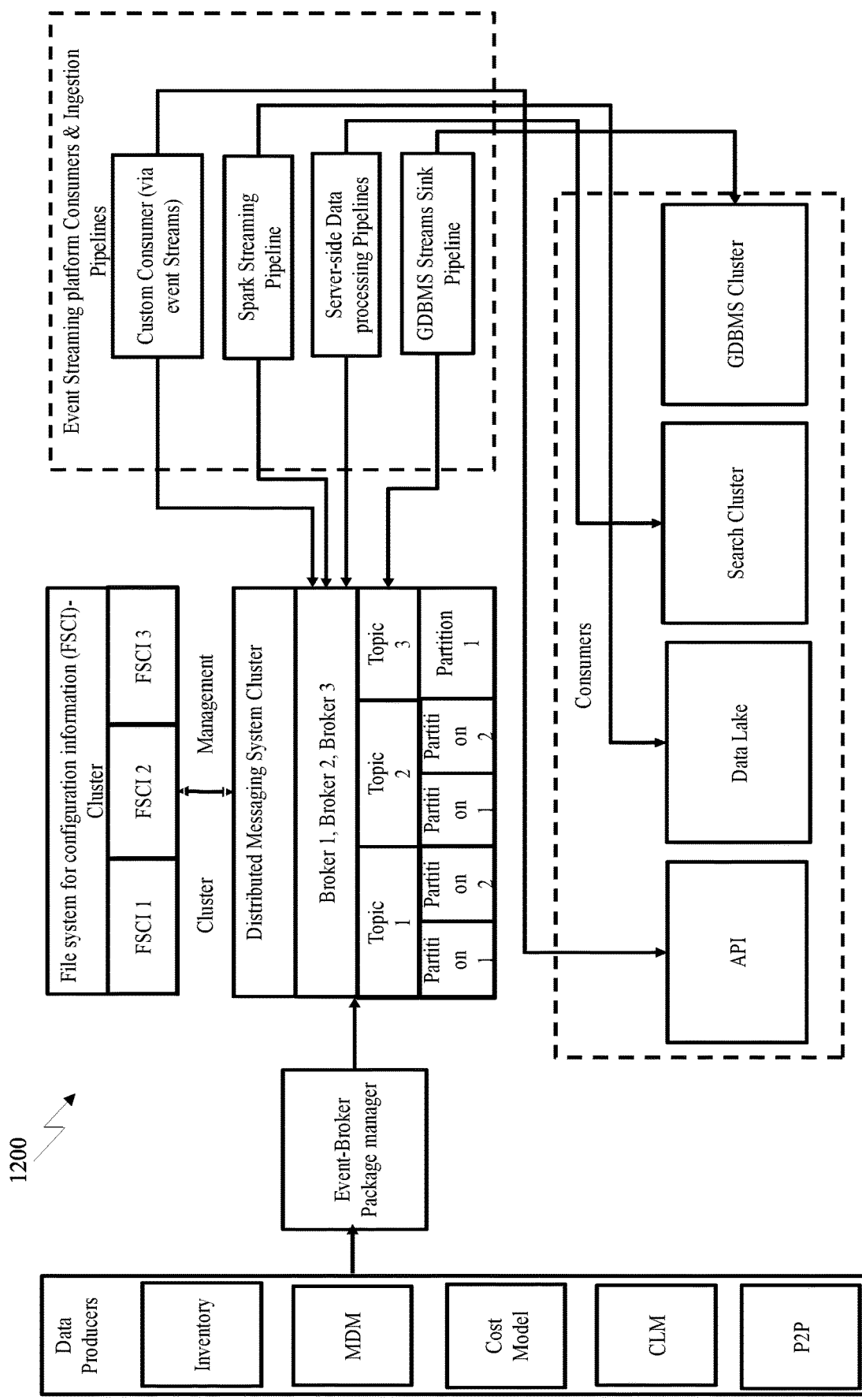
FIG. 12 is an event broker Architecture for data ingestion system in accordance with an example embodiment of the invention.

FIG. 12 is an event broker Architecture 1200 for data ingestion system in accordance with an example embodiment of the invention. The event broker architecture deals with a notion that data generated once can be consumed by multiple consumers depending on their requirement. The producers, as the name suggest are the products/application users who are generating data, this data can either be a transactional data, log data, user interaction data too. The data generated is used for further analysis, deriving useful information and it usually happens that there are different stakeholders and consumers who are interested in data for their respective products goals, analysis, pattern generation, resolving domain use-cases etc. The event broker architecture design helps to bind producers and consumers in a decoupled fashion, such that producers are only concerned about generating data and consumers about consuming data. The design enabled the pipeline between the producer and consumer so that data produced, can be collected, extracted, transformed and consumed without blocking both the stakeholders. The Components of the event broker architecture include event broker package manager, distributed messaging system, consumer pipelines like server-side data processing pipeline, and consumers. The Event broker package manager designed to have a robust connectivity with distributed messaging system components, thus verifying that high availability and retry mechanism is in place for any unseen failures this preventing any data loss through the channel. The distributed event streaming or messaging system also termed as a Messaging Queue System can stream millions of data with ease. The distributed messaging system includes brokers or nodes which form the Cluster for high availability. The FSCI (file system for configuration information) is part of the distributed messaging system cluster which helps in managing the Cluster. Individual Brokers comprise of topics which old data from different producers and to which consumers must subscribe to consume data. The topics are divided into partitions for high scalability, so data can be consumed in parallel. The Consumers must rely on already built robust commercial or opensource pipelines for extracting, transforming & ingesting data. The consumer pipelines with plugins are utilized in most of the scenarios as very well-developed plugins enables easy connect to multiple data sources and complex logic can be written for transforming data using programming language. Further, other consumer pipeline may be used that are configured for extracting & streaming data to Data Lakes for Analysis. The Consumers can directly connect to event streaming platform, or they can rely on consumer pipelines. In current scenario, Search, GDBMS (graphical database management system), Data Lake & Custom API are being showcased as consumers.

In an embodiment, the data network deals with integrating information into a single, enterprise-wide logical data model which only Graph technology can easily conceive this complex information and yet required information can be retrieved within milliseconds. Data Network as a strategy can only be possible once we see data flowing from different data sources thereby forming a relational model within the network. To achieve this data must flow through an ingestion process specifically designed for Data Network. We call this process as Data Network Ingestion Process wherein varied technologies have a role to play to bring the data into the Data Network. The data network Ingestion with event broker architecture 1200 helps to understand the schematic flow of the data from different data producers, processing through ETL pipelines and thereby getting mapped to the Data Network Model.

In a related embodiment, different set of data producers produce data which can either be a processed or an unprocessed one, data can either be operational data/business process data, user Inputs, user interaction data. Third Party data providers can also ingest data through a user interface. The data Ingestion Architecture follows an Event Broker Architecture where in producers must push data in event Broker Messaging Queue on to a specific Topic designed for the specific document Type. Event Broker Architecture is a system where in producers push their data to a topic within a Messaging Queue and consumers on other side of the Queue can subscribe to the respective Topic to pull the data and ingest data in respective data Store. Likewise, here the consumer is Graph Data Network which will subscribe to all the topics of the document types from which it needs to pull data from.

In a related embodiment, an invoice document event model 1200A is shown in accordance with an embodiment of the invention. Every data producer must ensure the transaction data has to follow a Standardized Event Model for pushing data to Messaging Queue. FIG. 12A represents an example of an Invoice Document Event Model which has 3 sub-parts, Event Header, Event & Event Data. The Event Header is related as metadata i.e data about event data. It indicates which application/document, client, creator of the data. This data benefits in identifying the specific tenant network to which the respective data should be ingested as well helps in categorizing the data based on the application/document type and also helps in relating it to the user master within the network. For Event, Data Source & Event type are the key identifiers in Event which can help in identifying the source of the document, its authenticity which can help in data validation techniques. The Event Types are additional information which help in identifying the action done on the data, we can relate it to crud actions on the data. The Event data is the actual schema of the document which will form the part of the Data Network. The internal schema of Event Data will change based on the document type.

In an embodiment, the data ingestion system of the present invention includes a data injection architecture including an event broker adapter, a broker cluster and a layered database structure with one or more-layer elements coupled to the processor and the analyzer for processing wherein the event broker adapter includes a native connector to an event broker API (Application programming interface).

Figure 13:
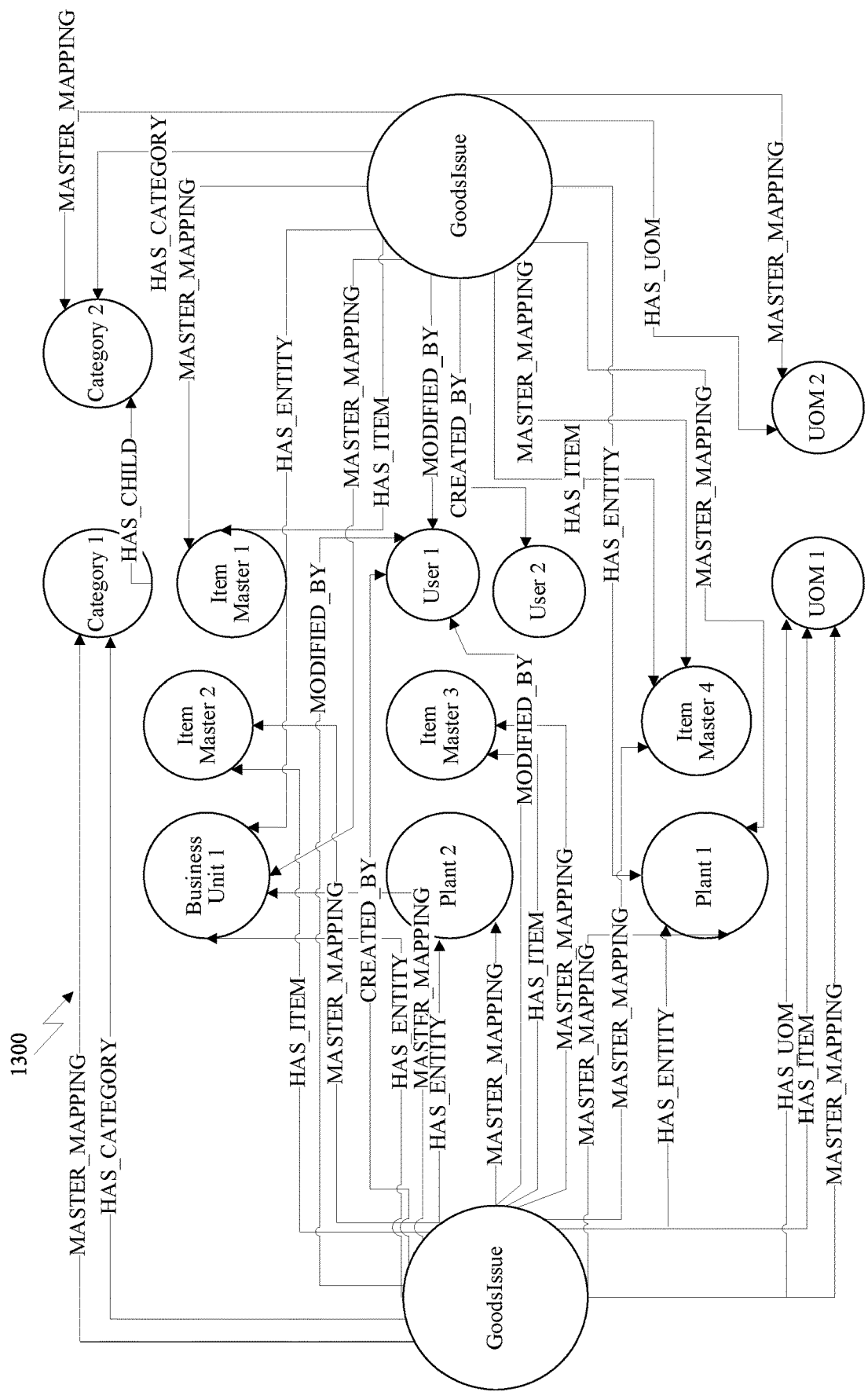
FIG. 13 is data network graph depicting inventory goods issue document and master data relationship in accordance with an example embodiment of the invention.

FIG. 13 is data network graph 1300 depicting inventory goods issue document and master data relationship in accordance with an example embodiment of the invention. The graph 1300 provides various good issues document (GI-12345) and its relationship with other master data associated with good issue. It provides information about users, items and other masters like UOM etc.

Figure 14:
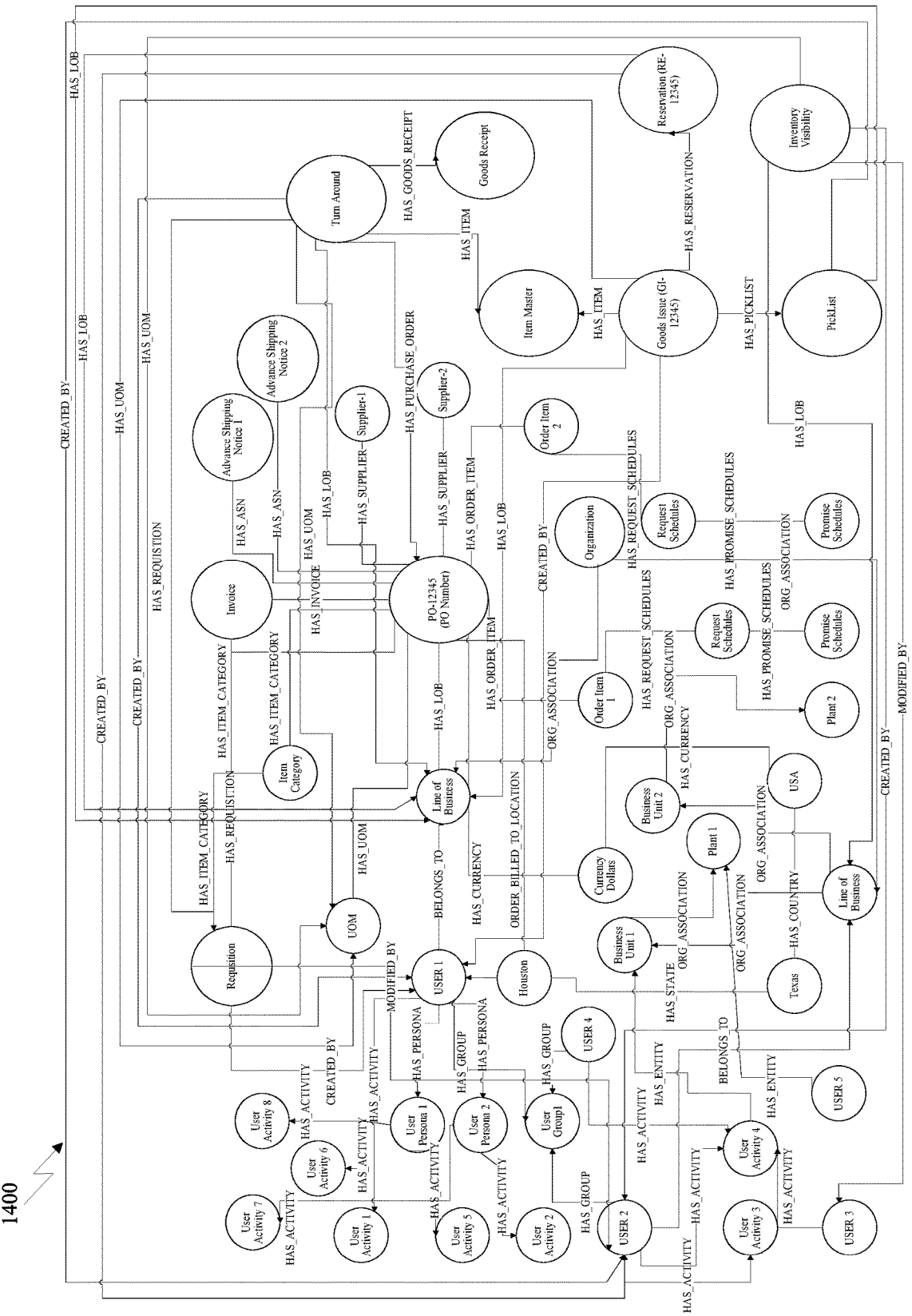
FIG. 14 is a data network graph depicting entity relationship across documents and master data in accordance with an example embodiment of the invention.

FIG. 14 is a data network graph 1400 depicting entity relationship across documents and master data in accordance with an example embodiment of the invention. The graph 1400 represents data network node dependencies of Items saved Inventory application with other documents in the chain. Good Issues in the warehouse application has relations with Good Reservations, Picking List, Item requested by User in Requisition, purchased using Purchase Order and Invoice sent by supplier. It shows connection with Users and Other Master Data.

In an embodiment, the data network identifier is a dynamic field identifier configured for validating the one or more data attributes with the one or more data models trained on the historical dataset wherein the AI engine matches the data attributes and if there is no match then the AI engine adds the data attribute as a new attribute.

In an embodiment, the one or more connectors of the data network is a linkedchain connector element for connecting the data objects through a set of connection protocols.

In an exemplary embodiment, the system may enable cognitive computing to improve interaction between a user and the enterprise application(s). The intelligent interface provides insight into dynamically changing parameters for execution of operations in SCM application through the structured data network connecting one or more data objects based on multiple relationship parameters determined by the AI engine.

In an advantageous aspect, the data ingestion system and method for a data network enable identification of relationship between data objects received from Sourcing, Procurement and Supply Chain for various industries like Oil & Gas, FMCG, Finance etc.

In an exemplary embodiment, the present invention may be a data ingestion system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of data ingestion in a data network, the method comprises:

receiving at a server, one or more data objects from at least one data source;

extracting by a data extraction process executed by a processor, one or more data elements and one or more data attributes associated with the one or more data objects;

processing, by the processor coupled to an AI engine, the extracted one or more data elements and the one or more data attributes to identify at least one relationship of the one or more extracted data attribute and the one or more data elements with one or more historical data elements stored in a historical data elements database wherein the at least one relationship is identified based on one or more data models associated with historical data elements database; and linking, by the processor and a data analyzer, the processed one or more data attribute to one or more historical data elements and assigning an identifier based on the at least one relationship to the one or more processed data elements of the data object associated with the data attribute before ingesting the data element in the data network as a data element node, wherein the data extraction process for extracting one or more data attributes and one or more data elements associated with the one or more data objects includes the steps of;

identifying a type of data object; and sending the data object to at least one data recognition training model for identification of the one or more data attribute wherein the data recognition training model processes the data object based on prediction analysis by a bot for obtaining the data attribute and one or more data elements with a confidence score, wherein the data network is a graphical data network configured to process a document data model, a relationship data model, and a graphical data model structured data objects wherein the AI engine coupled to the processor is configured to enable the network to assign the identifier for the one or more data elements based on the data attributes associated with the data objects.

2. The method of claim 1 wherein the one or more data object is a document or a text data or a voice data or an image data.

3. The method of claim 2 wherein the data attributes include attributes associated with content of the one or more data objects including order number, invoice number, and metadata of the data object wherein the content is the one or more data element.

4. The method of claim 3 wherein the one or more data elements stored in the historical data elements database includes historical data sets with relationships obtained from historical data objects related to enterprise application including invoice, purchase order, inventory details, tax documents, supplier documents, RFP (request for proposal), receipts, credit memo, ticketing and contracts.

5. The method of claim 1 wherein the data source includes master data, inventory, order, ASN, supplier, contracts, user, JOT device, invoice, retailers, suppliers, demand drivers, distributors, clients, logistics companies, third party manufacturers or mobile and JOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse, contract management, shipping notes, invoice, sourcing, or any data generating module associated with a supply chain function of an enterprise application.

6. The method of claim 1 wherein a document recognizer utilizes unsupervised learning to understand a layout and relationship between fields and entries in the data object wherein the bot clusters the data objects by type, discovers keys and associates values to keys before sending the keys as the identifier.

7. The method of claim 1 wherein for a pdf or image type data object the data extraction method includes:
    drawing a bounded box around the identified data attribute by a region of interest script;
    cropping the at least one identified data attribute in the drawn box;
    extracting text data from the data attribute by optical character recognition; and
    validating the text data after processing through an AI based data validation engine.

8. The method of claim 1 further comprises creating at least one training relationship data model from a data relationship tool by:
    retrieving the historical data elements from the historical data elements database;
    cleansing the historical data elements for obtaining normalized historical data;
    extracting a plurality of categories from the normalized historical data for creating taxonomy of relationships associated with the one or more data attributes;
    fetching a plurality of code vectors from the normalized historical data wherein the code vectors correspond to each of the extracted categories of the relationships;
    extracting a plurality of distinct words from the normalized historical data to create a list of variables;
    transforming normalized historical data into a training data matrix using the list of variables, and
    creating the training relationship data model from the classification code vectors and the training data matrix by using the machine learning engine (MLE) and the AI engine.

9. The method of claim 8 wherein the at least one training relationship data model is an ensemble of one or more data models, the relationship data model is created by:
    reading the training data matrix and the plurality of code vector;
    applying relational data model (RDM) algorithms to train one or more relational data model for the normalized historical data by using machine learning engine (MLE);
    applying document model (DM) algorithms to obtain document data models by using machine learning engine (MLE);
    applying graphical data model (GDM) algorithms to obtain graphical data models by using machine learning engine (MLE), and
    saving RDM, DM and GDM models as the training relationship models for identification of relationships in a training model database.

10. The method of claim 1 wherein in response to determination of the one or more data attribute or the one or more data element as a new data attribute or a new data element, the one or more data element node is ingested in the data network as a new data element node without any identifier providing relationship from the historical data element database.

11. The method of claim 10 wherein the data network includes a back-end server communicatively coupled to at least one database server, where the back-end server is configured to process the data object based on one or more data models by receiving from an ensemble of the one or more data models, a recommended identification parameter processed by the server and applying an AI based dynamic processing logic to the recommended identification parameter to automate tasks.

12. The method of claim 10 wherein the graphical data network includes a plurality of data element nodes linked to each other through one or more identifiers based on the data attributes and relationship wherein a sub-network for each of the plurality of data element nodes is created as a tenant data network that includes at least one event header, at least one event data attribute and at least one event data object for enabling creation of event data models as the one or more data models.

13. The method of claim 12 further comprises the steps of creating one or more application data models for each application executing one or more supply chain function wherein a templatized data mapper processes a template that includes application identifiers for classifying one or more application data attributes against the one or more data attributes of the data network.

14. The method of claim 13 wherein the template includes the application data attributes, master data reference, transactional data reference wherein the templatized data mapper is configured to update the template in real time to ensure the application is linked to the data network.

15. A system for data ingestion in a data network, the system comprises:
    a server for receiving one or more data objects from at least one data source;
    a processor configured to extract by a data extraction process, one or more data elements and one or more data attributes associated with the one or more data objects;
    a historical data elements database configured to store one or more historical data elements wherein the processor coupled to an AI engine processes the extracted one or more data elements and the one or more data attributes to identify at least one relationship of the one or more extracted data attribute with the one or more historical data elements based on one or more data models associated with the historical data elements database; and a data analyzer configured for enabling the processor to link the processed one or more data attribute to one or more historical data elements and assigning an identifier based on the at least one relationship to the one or more processed data elements of the data object associated with the data attribute before ingesting the data element in the data network as a data element node, wherein the data extraction process for extracting one or more data attributes associated with the one or more data objects includes the steps of:

identifying a type of data object; and sending the data object to at least one data recognition training model for identification of the one or more data attribute wherein the data recognition training model processes the data object based on prediction analysis by a bot for obtaining the data attribute with a confidence score, wherein the data network is a graphical data network configured to process a document data model, a relationship data model, and a graphical data model structured data objects wherein the AI engine coupled to the processor is configured to enable the network to assign the identifier for the one or more data elements based on the data attributes associated with the data objects.

16. The system of claim 15 wherein the one or more data object is a document or a text data or a voice data or an image data.

17. The system of claim 16 wherein the at least one data source includes a master data, inventory, order, RFX, ASN, supplier, contracts, user, IOT device, invoice retailers, suppliers, demand drivers, distributors, clients, logistics companies, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse, contract management, shipping notes, invoice, sourcing, or any data generating module associated with a supply chain function of an enterprise application (EA).

18. The system of claim 17 wherein the at least one data source is a linkedchain implemented data source or a non-linkedchain implemented data source wherein for the linkedchain implemented data source the one or more objects received at the server are connected to a linkedchain architecture of the data source and an adapter having a configurator and access control module connects to the linkedchain architecture for enabling fetching of the data objects generated by the at least one data source.

19. The system of claim 17 wherein the at least one data source is a graphchain implemented data source with a plurality of decentralized RDF (resource data framework) graphs connected to each other and structuring a linkedchain of the RDF graphs thereby providing a self-scaling and self-regulated cross-verifying transaction framework as the graphchain disseminates the data objects in data shards between multiple nodes in the RDF graph.

20. The system of claim 19 further comprises a data injection architecture including an event broker adapter, a broker cluster and a layered database structure with one or more-layer elements coupled to the processor and the analyzer for processing wherein the event broker adapter includes a native connector to an event broker API (Application programming interface).

21. The system of claim 15 wherein the data attributes include attributes associated with content of the one or more data objects including order number, invoice number, and metadata of the data object wherein the content is the one or more data element.

22. The system of claim 21 wherein the one or more data elements stored in the historical data elements database includes historical data sets with relationships obtained from historical data objects related to enterprise application including invoice, purchase order, inventory details, tax documents, supplier documents, RFP (request for proposal), receipts, credit memo, ticketing and contracts.

23. The system of claim 15 wherein for a pdf or image type data object the data extraction method includes:
drawing a bounded box around the identified data attribute by a region of interest script;
cropping the at least one identified data attribute in the drawn box;
extracting text data from the data attribute by optical character recognition; and
validating the text data after processing through an AI based data validation engine.

24. The system of claim 15 further comprises a data relationship tool configured to create at least one training relationship data model by:
retrieving the historical data elements from the historical data elements database;
cleansing the historical data elements for obtaining normalized historical data;
extracting a plurality of categories from the normalized historical data for creating taxonomy of relationships associated with the one or more data attributes;
fetching a plurality of code vectors from the normalized historical data wherein the code vectors correspond to each of the extracted categories of the relationships;
extracting a plurality of distinct words from the normalized historical data to create a list of variables;
transforming normalized historical data into a training data matrix using the list of variables, and
creating the training relationship data model from the classification code vectors and the training data matrix by using the machine learning engine (MLE) and the AI engine.

25. The system of claim 24, wherein the at least one training relationship data model is an ensemble of one or more data models, the relationship data model is created by
reading the training data matrix and the plurality of code vector;
applying relational data model (RDM) algorithms to train one or more relational data model for the normalized historical data by using machine learning engine (MLE);
applying document model (DM) algorithms to obtain document data models by using machine learning engine (MLE);
applying graphical data model (GDM) algorithms to obtain graphical data models by using machine learning engine (MLE), and
saving RDM, DM and GDM models as the training relationship models for identification of relationships in a training model database.

26. The system of claim 15 wherein the data network includes a back-end web server communicatively coupled to at least one database server, where the back-end web server is configured to process the data object based on one or more data models by receiving from an ensemble of the one or more data models, a recommended identification parameter processed by the server and applying an AI based dynamic processing logic to the recommended identification parameter to automate tasks.

27. The system of claim 15 wherein the graphical data network includes a plurality of data element nodes linked to each other through one or more identifiers based on the data attributes and relationship wherein a sub-network for each of the plurality of data element nodes is created as a tenant data network that includes at least one event data header, at least one event data attribute and at least one event data object for enabling creation of event data models as the one or more data models.

28. The system of claim 27 wherein the AI engine coupled to the processor is configured to create one or more application data models for each application executing one or more supply chain function wherein a templatized data mapper processes a template that includes application identifiers for classifying one or more application data attributes against the one or more data attributes of the data network.

29. The system of claim 28 wherein the template includes the application data attributes, master data reference, transactional data reference wherein the templatized data mapper is configured to update the template in real time to ensure the application is linked to the data network.

* * * * *